(12) United States Patent
Dwyer et al.

(10) Patent No.: US 8,837,357 B2
(45) Date of Patent: Sep. 16, 2014

(54) METHODS AND APPARATUS FOR MOBILE VOICE SERVICE MANAGEMENT

(75) Inventors: Johanna Lisa Dwyer, Ottawa (CA); Richard Charles Burbidge, Hook (GB); Stefano Faccin, Hayward, CA (US); Chen Ho Chin, Deerlijk (BE)

(73) Assignee: BlackBerry Limited, Waterloo (CA)

( * ) Notice: Subject to any disclaimer, the term of this patent is extended or adjusted under 35 U.S.C. 154(b) by 502 days.

(21) Appl. No.: 12/828,746

(22) Filed: Jul. 1, 2010

(65) Prior Publication Data

US 2011/0158165 A1 Jun. 30, 2011

Related U.S. Application Data

(60) Provisional application No. 61/222,925, filed on Jul. 2, 2009.

(51) Int. Cl.
*H04W 4/00* (2009.01)
*H04W 60/00* (2009.01)

(52) U.S. Cl.
CPC .................................. *H04W 60/00* (2013.01)
USPC ..... 370/328; 370/331; 455/432.1; 455/435.1; 455/435.2; 455/436

(58) Field of Classification Search
None
See application file for complete search history.

(56) References Cited

U.S. PATENT DOCUMENTS

| | | | |
|---|---|---|---|
| 5,353,332 A | 10/1994 | Raith et al. | |
| 6,870,820 B1 * | 3/2005 | Forssell et al. | 370/328 |
| 6,965,948 B1 * | 11/2005 | Eneborg et al. | 709/250 |
| 7,366,152 B2 * | 4/2008 | O'Neill et al. | 370/338 |
| 7,856,226 B2 * | 12/2010 | Wong et al. | 455/414.1 |
| 7,904,055 B2 | 3/2011 | Lee et al. | |
| 7,990,957 B2 * | 8/2011 | Song et al. | 370/354 |
| 8,064,907 B2 * | 11/2011 | Gallagher et al. | 455/435.1 |
| 8,194,613 B2 * | 6/2012 | Lee et al. | 370/331 |
| 8,238,267 B2 * | 8/2012 | Dwyer et al. | 370/254 |
| 8,422,457 B2 * | 4/2013 | Dwyer et al. | 370/331 |
| 8,543,114 B2 * | 9/2013 | Hallenstal et al. | 455/436 |
| 2003/0045290 A1 | 3/2003 | Tuohimetsa et al. | |
| 2003/0105864 A1 | 6/2003 | Mulligan et al. | |
| 2004/0184452 A1 | 9/2004 | Huotari et al. | |
| 2004/0203775 A1 | 10/2004 | Bourdeaut | |

(Continued)

FOREIGN PATENT DOCUMENTS

| | | |
|---|---|---|
| CN | 1894911 | 1/2007 |
| CN | 101291537 | 10/2008 |

(Continued)

OTHER PUBLICATIONS

International Searching Authority, International Search Report issued in connection with PCT/US2010/040740, mailed on Oct. 14, 2010, 5 pages.

(Continued)

*Primary Examiner* — Michael J Moore, Jr.
(74) *Attorney, Agent, or Firm* — Hanley, Flight & Zimmerman, LLC

(57) ABSTRACT

Methods and apparatus for mobile voice service management are described. An example method includes receiving a mobile network request for registering with a mobile network and responsive to the mobile network request, sending a response including an area identity list and an identifier indicating whether an area identified in the tracking area identity list supports a service.

24 Claims, 27 Drawing Sheets

(56) References Cited

U.S. PATENT DOCUMENTS

| | | | |
|---|---|---|---|
| 2004/0266435 A1 | 12/2004 | de Jong et al. | |
| 2005/0213541 A1* | 9/2005 | Jung et al. | 370/331 |
| 2007/0064709 A1 | 3/2007 | Holmstrom et al. | |
| 2007/0130465 A1 | 6/2007 | Zeng et al. | |
| 2007/0173264 A1* | 7/2007 | Duan | 455/456.1 |
| 2007/0174443 A1 | 7/2007 | Shaheen et al. | |
| 2007/0206620 A1 | 9/2007 | Cortes et al. | |
| 2008/0020745 A1* | 1/2008 | Bae et al. | 455/422.1 |
| 2008/0102896 A1* | 5/2008 | Wang et al. | 455/560 |
| 2008/0125120 A1 | 5/2008 | Gallagher | |
| 2008/0188247 A1 | 8/2008 | Worrall | |
| 2008/0220782 A1 | 9/2008 | Wang et al. | |
| 2008/0261593 A1* | 10/2008 | Wong et al. | 455/435.1 |
| 2008/0267128 A1 | 10/2008 | Bennett et al. | |
| 2008/0305825 A1 | 12/2008 | Shaheen | |
| 2009/0036131 A1 | 2/2009 | Diachina et al. | |
| 2009/0104910 A1 | 4/2009 | Lee | |
| 2009/0111423 A1 | 4/2009 | Somasundaram et al. | |
| 2009/0154408 A1 | 6/2009 | Jeong et al. | |
| 2009/0238117 A1 | 9/2009 | Somasundaram et al. | |
| 2009/0238143 A1 | 9/2009 | Mukherjee et al. | |
| 2009/0239584 A1 | 9/2009 | Jheng et al. | |
| 2009/0268635 A1 | 10/2009 | Gallagher et al. | |
| 2009/0270097 A1 | 10/2009 | Gallagher et al. | |
| 2009/0270098 A1* | 10/2009 | Gallagher et al. | 455/435.1 |
| 2009/0280814 A1 | 11/2009 | Farnsworth | |
| 2009/0285157 A1 | 11/2009 | Yeoum et al. | |
| 2010/0022241 A1 | 1/2010 | Hokao | |
| 2010/0048168 A1 | 2/2010 | Fox | |
| 2010/0075651 A1 | 3/2010 | Hallenstal et al. | |
| 2010/0075670 A1 | 3/2010 | Wu | |
| 2010/0093350 A1 | 4/2010 | Wang et al. | |
| 2010/0098023 A1 | 4/2010 | Aghili et al. | |
| 2010/0099402 A1 | 4/2010 | Wu | |
| 2010/0120455 A1 | 5/2010 | Aghili et al. | |
| 2010/0130218 A1 | 5/2010 | Zhang et al. | |
| 2010/0172347 A1 | 7/2010 | Zisimopoulos | |
| 2010/0182971 A1 | 7/2010 | Chin | |
| 2010/0234026 A1 | 9/2010 | Tenny et al. | |
| 2010/0260105 A1 | 10/2010 | Keller et al. | |
| 2010/0265847 A1 | 10/2010 | Lee et al. | |
| 2010/0265884 A1 | 10/2010 | Vikberg et al. | |
| 2010/0265914 A1* | 10/2010 | Song et al. | 370/331 |
| 2010/0278146 A1 | 11/2010 | Aoyama et al. | |
| 2010/0279648 A1 | 11/2010 | Song et al. | |
| 2010/0297979 A1 | 11/2010 | Watfa et al. | |
| 2010/0329244 A1 | 12/2010 | Buckley et al. | |
| 2011/0002267 A1* | 1/2011 | Dwyer et al. | 370/328 |
| 2011/0002268 A1* | 1/2011 | Dwyer et al. | 370/328 |
| 2011/0002327 A1 | 1/2011 | Dwyer et al. | |
| 2011/0009113 A1 | 1/2011 | Vikberg et al. | |
| 2011/0045830 A1 | 2/2011 | Wu | |
| 2011/0171924 A1 | 7/2011 | Faccin et al. | |
| 2011/0171925 A1 | 7/2011 | Faccin et al. | |
| 2011/0171926 A1 | 7/2011 | Faccin et al. | |
| 2011/0207462 A1* | 8/2011 | Hallenstal et al. | 455/436 |
| 2011/0274090 A1* | 11/2011 | Hallensal et al. | 370/331 |
| 2011/0305192 A1 | 12/2011 | Faccin et al. | |
| 2012/0014324 A1* | 1/2012 | Dwyer et al. | 370/328 |
| 2012/0014354 A1* | 1/2012 | Dwyer et al. | 370/331 |
| 2012/0014381 A1 | 1/2012 | Dwyer et al. | |
| 2012/0077497 A1* | 3/2012 | Shaheen | 455/435.1 |
| 2012/0106324 A1* | 5/2012 | Keller et al. | 370/225 |

FOREIGN PATENT DOCUMENTS

| | | |
|---|---|---|
| EP | 1983796 | 10/2008 |
| EP | 2046071 | 4/2009 |
| SG | 176236 | 1/2012 |
| WO | 2008013291 | 1/2008 |
| WO | 2009102368 | 8/2009 |
| WO | 2009151372 | 12/2009 |
| WO | 2010141784 | 12/2010 |
| WO | 2011020002 | 2/2011 |

OTHER PUBLICATIONS

International Searching Authority,Written Opinion issued in connection with PCT/US2010/040740, mailed on Oct. 14, 2010, 8 pages.

3rd Generation Partnership Project Technical Specification Group Services and System Aspects General Packet Radio Service (GPRS) enchancements for Evolved Universal Terrestrial Radio Access Network (E-UTRAN) access (Release 9); 3GPP Standard; 3GPP TS 23.401, Valbonne, France, V9.1.0, Jun. 2009, 234 pages.

Nokia Siemens Networks et al: IMS voice Indication; 3GPP Draft; S2-094179 was 4001 Voims Indicatorr8-Rev, 3rd Generation Partnership Project (3GPP); Mobile Competence Centre; 650, Route Des Lucioles; F-06921 Sophia-Antipolis Cedex; France; no. Tallinn; May 15, 2009, 19 pages.

Nokia Siemens Networks et al: Introduction of Voice over IMS session support indication; 3GPP Draft; C1-092867-VOIMS-24301-821, 3rd Generation Partnership Project (3GPP); Mobile Competence Centre; 650, Route Des Lucioles; F-06921 Sophia-Antipolis Cedex; France; no. Los Angeles; May 15, 2009, Jul. 1, 2009, 14 pages.

Nokia Siemens Networks et al: Introduction of Voice over IMS session support indication; 3GPP Draft; C1-092353-VOIMS-24301-821, 3rd Generation Partnership Project (3GPP); Mobile Competence Centre; 650, Route Des Lucioles; F-06921 Sophia-Antipolis Cedex; France; no. Los Angeles; Jul. 1, 2009, 14 pages.

Nokia Siemens Networks et al: Introduction of Voice over IMS session support indication; 3GPP Draft; C1-092354-VOIMS-24008-860, 3rd Generation Partnership Project (3GPP); Mobile Competence Centre; 650, Route Des Lucioles; F-06921 Sophia-Antipolis Cedex; France; no. Los Angeles; Jul. 1, 2009, 13 pages.

SA2: LS on Principles for voice domain selection; 3GPP Draft; R2-093649_S2-094238, 3rd Generation Partnership Project (3GPP); Mobile Competence Centre; 650, Route Des Lucioles; F-06921 Sophia-Antipolis Cedex; France; no. Los Angeles; Jul. 1, 2009, 2 pages.

Nokia Siemens Networks: "Introduction of Voice over IMS session support indication" 3GPP Change Request; C1-092353, 3rd Generation Partnership Project (3GPP), 24.301 CR 0279, rev 1; Los Angeles, V8.2.1, Jun. 22-26, 2009, 15 pages.

Nokia Siemens Networks, Motorola: Introduction of Voice over IMS session support indication; 3GPP Change Request; C1-0923, 3rd Generation Partnership Project (3GPP), 24.008 CR 1309, rev 1; Los Angeles, V8.6.0, Jun. 22-26, 2009, 14 pages.

Motorola: Approaches to stop CS/PS Mode 1 UE from HO to non-CSFB Lte; 3GPP Draft; TD S2-093264, 3rd Generation Partnership Project (3GPP); Tallinn; May 11-15, 2009, 2 pages.

Ericsson: CS domain and IM CN Subsystem selection principles; 3GPP Change Request; S20941, 3rd Generation Partnership Project (3GPP), 23.221 CR 0065, rev 8; Los Angeles, V8.3.0, May 11-15, 2009, 10 pages.

SA2: LS on Principles for voice domain selection; 3GPP Draft; TD S2-094238, 3rd Generation Partnership Project (3GPP); Tallinn; May 11-15, 2009, 2 pages.

Motorola: MS Voice Session Supported Indication; 3GPP Change Request; TD S2-094147, 3rd Generation Partnership Project (3GPP), 23.060 CR 0824, rev 5; Tallin, V8.4.0, May 11-15, 2009, 45 pages.

Nokia Siemens Networks, Nokia: IMS voice Indication; 3GPP Change Request; S2-094179, 3rd Generation Partnership Project (3GPP), 23.401 CR 0996, rev 4; Tallinn, V8.5.0, May 11-15, 2009, 20 pages.

3rd Generation Partnership Project; Technical Specification Group Services and System Aspects; General Packet Radio Service (GPRS); Service description; Stage 2 (Release 9); 3GPP Standard; 3GPP TS 23.060, Valbonne, France, V9.1.1, Jun. 2009, 283 pages.

3rd Generation Partnership Project; Technical Specification Group Services and System Aspects; General Packet Radio Service (GPRS); Service description; Stage 2 (Release 8); 3GPP Standard; 3GPP TS 23.060, Valbonne, France, V8.5.1, Jun. 2009, 278 pages.

3rd Generation Partnership Project; Technical Specification Group Services and System Aspects; Architectural requirements (Release 8); 3GPP Standard; 3GPP TS 23.060, Valbonne, France, V8.4.0, Jun. 2009, 46 pages.

(56) References Cited

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 8); 3GPP Standard; 3GPP TS 36.331, Valbonne, France, V8.6.0, Jun. 2009, 207 pages.
3rd Generation Partnership Project Technical Specification Group Services and System Aspects General Packet Radio Service (GPRS) enchancements for Evolved Universal Terrestrial Radio Access Network (E-UTRAN) access (Release 8); 3GPP Standard; 3GPP TS 23.401, Valbonne, France, V8.6.0, Jun. 2009, 227 pages.
3rd Generation Partnership Project; Technical Specification Group Service and System Aspects; Circuit Switched (CS) fallback in Evolved Packet System (EPS); Stage 2 (Release 9), 3GPP Standard; 3GPP TS 23.272, Valbonne, France, vol. 9.3.0, Mar. 2010, 66 pages.
3rd Generation Partnership Project; Technical Specification Group Service and System Aspects; Architectural requirements (Release 9), 3GPP Standard; 3GPP TS 23.221, Valbonne, France, vol. 9.3.0, Mar. 2010, 47 pages.
3rd Generation Partnership Project; Technical Specification Group Core Network and Terminals; Mobile readio interface Layer 3 specification; Core network protocols; Stage 3 (Release 9), 3GPP Standard; 3GPP TS 24.008, Valbonne, France, vol. 9.2.0, Mar. 2010, 605 pages.
3rd Generation Partnership Project; Technical Specification Group Terminals; Application and User interaction in the UE-Principles and specific requirements (Release 5), 3GPP Standard; 3GPP TS 23.277, Valbonne, France, vol. 5.1.0, Mar. 2002, 13 pages.
3rd Generation Partnersip Project; Technical Specification Group Care Network and Terminals; Non-Access-Stratum (NAS) functions related to Mobile Station (MS) in idle mode (Release 9), 3GPP Standard; 3GPP TS 23.122, Valbonne, France, vol. 9.2.0, Mar. 2010, 41 pages.
3rd Generation Partnership Project; Technical Specification Group Core Network; and Terminals; Non-Access-Stratum (NAS) protocol for Evolved Packet System (EPS); Stage 3 (Release 9), 3GPP Standard; 3GPP TS 24.301, Valbonne, France, vol. 9.2.0, Mar. 2010, 293 pages.
3rd Generation Partnership Project; Technical Specification Group Core Network; Evolved Universal Terrestrial Radio Access (E-UTRA); User Equipment (UE) procedures in idle mode (Release 9); 3GPP Standard; 3GPP TS 36.304, Valbonne, France, vol. 9.2.0, Mar. 2010, 32 pages.
3rd Generation Partnership Project; Technical Specification Group Radio Access Network; User Equipment (UE) procedures in idle mode and procedures for cell reselection in connected mode (Release 9); 3GPP Standard; 3GPP TS 25.304, Valbonne, France, vol. 9.1.0, Mar. 2010, 50 pages.
International Searching Authority, International Preliminary Report on Patentability and Written Opinion issued in International Application No. PCT/US2011/039807, issued on Dec. 27, 2012, 8 pages.
3rd Generation Partnership project;Technical Specification Group; Radio Access Network (RAN); Working Group 2 (WG2); "Voice Mode Selection for CS Fallback and IMS", 3GPP TSG SA WG2 Meeting #73, Tallin, Estonia, Mar. 11, 2009, 6 pages.
International Search Authority, International Search Report and Opinion issued in PCT/US2011/039807, dated Nov. 16, 2011, 13 pages.
International Searching Authority, Preliminary Report on Patentability and Written Opinion issued in International Application No. PCT/US2011/039807, issued on Dec. 14, 2012, 7 pages.
United States Patent and Trademark Office, office action issued in U.S. Appl. No. 12/813,954, Feb. 13, 2013, 18 pages.
United States Patent and Trademark Office, office action issued in U.S. Appl. No. 12/813,954, Jun. 20, 2012, 19 pages.
United States Patent and Trademark Office, "Non-Final Office Action," issued in connection with U.S. Appl. No. 13/244,744, on Dec. 9, 2011, 8 pages.
United States Patent and Trademark Office, "Non-Final Office Action," issued in connection with U.S. Appl. No. 13/244,744, on Aug. 14, 2012, 12 pages.
United States Patent and Trademark Office, "Final Rejection," issued in connection with U.S. Appl. No. 13/244,744, on May 24, 2012, 12 pages.
United States Patent and Trademark Office, "Non-Final Office Action," issued in connection with U.S. Appl. No. 13/793,670, on Nov. 30, 2011, 15 pages.
United States Patent and Trademark Office, "Non-Final Office Action," issued in connection with U.S. Appl. No. 13/793,670, on May 22, 2012, 21 pages.
United States Patent and Trademark Office, "Non-Final Office Action," issued in connection with U.S. Appl. No. 13/244,721, on Nov. 15, 2011, 10 pages.
United States Patent and Trademark Office, "Non-Final Office Action," issued in connection with U.S. Appl. No. 13/244,721, on Mar. 8, 2012, 11 pages.
United States Patent and Trademark Office, "Notice of Allowance," issued in connection with U.S. Appl. No. 13/244,721, on May 17, 2012, 5 pages.
United States Patent and Trademark Office, "Non-Final Office Action," issued in connection with U.S. Appl. No. 12/793,673, on Jul. 17, 2012, 30 pages.
United States Patent and Trademark Office, "Notice of Allowance," issued in connection with U.S. Appl. No. 12/793,673, on Feb. 11, 2013, 14 pages.
United States Patent and Trademark Office, "Non-Final Office Action," issued in connection with U.S. Appl. No. 13/244,728, on Feb. 25, 2013, 27 pages.
United States Patent and Trademark Office, "Non-Final Office Action," issued in connection with U.S. Appl. No. 13/244,728, on Dec. 8, 2011, 10 pages.
United States Patent and Trademark Office, "Final Rejection," issued in connection with U.S. Appl. No. 13/244,728, on May 29, 2012, 15 pages.
United States Patent and Trademark Office, "Non-Final Office Action," issued in connection with U.S. Appl. No. 13/793,668, on May 29, 2012, 28 pages.
United States Patent and Trademark Office, "Final Rejection," issued in connection with U.S. Appl. No. 13/793,668, on Dec. 20, 2012, 40 pages.
United States Patent and Trademark Office, "Advisory Action," issued in connection with U.S. Appl. No. 12/813,954, on May 21, 2013, 2 pages.
Institute of Mexican Industrial Property, "Office Action," issued in connection with MX patent application No. MX/a/2011/012978, on Apr. 19, 2013, 2 pages.
Intellectual Property Office of Singapore, "Notification of Grant," issued in connection with in SG patent application No. 201108728-5, on Nov. 30, 2012, 2 pages.
Australian Patent Office, "Patent Examination Report No. 1," issued in connection with AU patent application No. 2010256525, on May 17, 2013, 2 pages.
Intellectual Property Office of Japan, "Notice of Reasons for Rejection," issued in connection with JP patent application No. 2012-514159, on Jan. 15, 2013, 6 pages.
Intellectual Property Office of Japan, "Notice of Reasons for Rejection," issued in connection with JP patent application No. 2012-514161, on Jan. 22, 2013, 6 pages
Intellectual Property Office of Japan, "Notice of Reasons for Rejection," issued in connection with JP patent application No. 2012-514162, on May 20, 2013, 7 pages.
Patent Coorporation Treaty, International Bureau, "International Preliminary Report on Patentability," issued in connection with PCT patent application No. PCT/US2010/037339, on Dec. 15, 2011, 7 pages
Patent Coorporation Treaty, International Bureau, "International Preliminary Report on Patentability," issued in connection with PCT patent application No. PCT/US2010/037340, on Dec. 15, 2011, 10 pages.

(56) References Cited

OTHER PUBLICATIONS

Patent Coorporation Treaty, International Bureau, "International Preliminary Report on Patentability," issued in connection with PCT patent application No. PCT/US2010/040740, on Jan. 12, 2012, 8 pages.
Patent Coorporation Treaty, International Bureau, "International Preliminary Report on Patentability." issued in connection with PCT patent application No. PCT/US2010/07336, on Dec. 15, 2011, 8 pages..
Patent Coorporation Treaty, International Searching Authority, "International Search Report," issued in connection with PCT/US2010/037340, on Jan. 3, 2011, 5 pages.
Patent Coorporation Treaty, International Searching Authority, "Written Opinion of the International Searching Authority," issued in connection with PCT/US2010/037340, Jan. 3, 2011, 8 pages.
Patent Coorporation Treaty, International Searching Authority, "International Search Report," issued in connection with PCT/US2010/037336, on Oct. 28, 2010, 3 pages.
Patent Coorporation Treaty, International Searching Authority, "Written Opinion of the International Searching Authority," issued in connection with PCT/US2010/037336, on Oct. 28, 2010, 6 pages.
Korean Intellectual Property Office, "Notice of Allowance," issued in connection with application No. KR 10-2012-7000069, on Mar. 21, 2014, 3 pages.
IP Australia, "Notice of Acceptance," issued in connection with application No. AU2010254797, on Apr. 3, 2014, 2 pages.
European Patent Office, "Examination Report," issued in connection with application No. EP11728459.6, on Mar. 25, 2014, 4 pages.
United States Patent and Trademark Office, "Final Office Action," issued in connection with U.S. Appl. No. 13/244,744, on Mar. 28, 2013, 36 pages.
Canadian Intellectual Property Office, "Office Action," issued in connection with application No. CA 2,764,459, on Oct. 1, 2013, 3 pages.
Intellectual Property Office of Japan, "Notice of Reasons for Rejection," issued in connection with application No. JP 2012-514159, on Aug. 19, 2013, 7 pages.
Korean Intellectual Property Office, "Office Action," issued in connection with application No. KR 10-2012-7000068, on Jul. 31, 2013, 9 pages.
International Bureau, "International Preliminary Report on Patentability," issued in connection with No. PCT/US2010/037337, mailed on Dec. 15, 2011, 7 pages.
International Searching Authority, "International Search Report and Written Opinion," issued in connection with PCT/US2010/037337, mailed on Nov. 3, 2010, 8 pages.
United States Patent and Trademark Office, "Final Office Action," issued in connection with U.S. Appl. No. 13/244,728, on Aug. 14, 2013, 33 pages.
IP Australia, "Patent Examination Report No. 1," issued in connection with application No. AU 2010256524, on May 24, 2013, 3 pages.
Canadian Intellectual Property Office, "Office Action," issued in connection with application No. CA 2,764,455, on Sep. 27, 2013, 3 pages.
Japanese Patent Office, "Notice of Reasons for Rejection," issued in connection with application No. JP 2012-514158, on Jun. 25, 2013, 6 pages.
Korean Intellectual Property Office, "Office Action," issued in connection with application No. KR 10-2012-7000060, on Jul. 31, 2013, 11 pages.
United States Patent and Trademark Office, "Non-Final Office Action," issued in connection with U.S. Appl. No. 12/813,954, on Jul. 19, 2013, 27 pages.
IP Australia, "Patent Examination Report No. 1," issued in connection with application No. AU 2010254797, on May 22, 2013, 3 pages.
Korean Intellectual Property Office, "Office Action," issued in connection with application No. KR 10-2012-7000069, on Jul. 31, 2013, 8 pages.
Institute of Mexican Industrial Property, "Notice of Allowance," issued in connection with application No. MX/a/2011/012978, on Aug. 23, 2013, 1 page.
International Searching Authority, "International Search Report and Written Opinion," issued in connection with PCT/US2010/037339, mailed on Oct. 20, 2010, 8 pages.
Korean Intellectual Property Office, "Office Action" with translation, issued in connection with application No. KR 10-2012-7000070, on Jun. 28, 2013, 7 page.
International Searching Authority, "Invitation to Pay Additional Fees and Partial International Search," issued in connection with PCT/US2010/037340, mailed on Oct. 29, 2010, 7 pages.
3rd Generation Partnership Project; Technical Specification Group Core Network and Terminals; Non-Access-Stratum (NAS) protocol for Evolved Packet System (EPS); Stage 3 (Release 8); 3GPP Standard; 3GPP TS 24.301, Valbonne, France, vol. 8.1.0, Mar. 2009, 250 pages.
3rd Generation Partnership Project; Technical Specification Group Core Network and Terminals; Mobile radio interface Layer 3 specification; Core network protocols; Stage 3 (Release 8); 3GPP Standard; 3GPP TS 24.008, Valbonne, France, vol. 8-5.0, Mar. 2009, 581 pages.
3rd Generation Partnership Project; Technical Specification Group Core Network and Terminals; Ip multimedia call control protocol based on Session Initiation Protocol (SIP) and Session Description Protocol (SOP); Stage 3 (Release 8); 3GPP Standard; 3GPP TS 24.229, vol. 8.7.0, Mar. 2009, 660 pages.
3rd Generation Partnership Project; Technical Specification Group Radio Access Network; Evolved Universal Terrestrial Radio Access (E-UTRA); User Equipment (UE) procedures in idle mode (Release 8); 3GPP Standard; 3GPP TS 36.304, Valbonne, France, vol. 8.5.0, Mar. 2009, 30 pages.
3rd Generation Partnership Project; Technical Specification Group Radio Access Network; Radio Resource Control (RRC); Protocol Specification (Release 8); 3GPP Standard; 3GPP TS 25.331, Valbonne, France, vol. 8.6.0, Mar. 2009, 1,673 pages.
3rd Generation Partnership Project; Technical Specification Group Radio Access Network; User Equipment (UE) procedures in idle mode and procedures for cell reselection in connected mode (Release 8); 3GPP Standard; 3GPP TS 25.304, Valbonne, France, vol. 8.5.0, Mar. 2009, 49 pages.
CT1: "Response LS on CS domain and IM CN subsystem selection principles" Apr. 27, 2009; 3GPP Draft, C1-092262, 3GPP Mobile Competence Centre; 650, Route Des Lucioles; F-06921 Sophia-Antipolis Cedex; France, XP050337399, 5 pages.
NEC: "Discussion on CS/PS. modes of operation and interactions with AS" Apr. 20-24, 2009, 3GPP Draft; C1-091801, 3GPP Mobile Competence Centre; 650, Route Des Lucioles; F-06921 Sophia-Antipolis Cedex; France, XP050337399, 3 pages.
Nokia Siemens Networks et al: "Handling of CS/PS. Mode Selection" 3GPP Draft; R2-092998 (CSFB Mode), 3GPP Mobile Competence Centre; 650, Route Des Lucioles; F-06921 Sophia-Antipolis Cedex; France, No. San Francisco, USA; May 4-8, 2009, 6 pages.
Nit Docomo et al: "CS/PS mode of operation" 3GPP Draft; R2-093270 CS-PS Mode, 3GPP, Mobile Competence Centre; 650, Route Des Lucioles, F-06921 Sophia-Antipolis Cedex; France, No. San Francisco, USA; May 4-8, 2009, 4 pages.
T-Mobile: "Voice mode selection for CSS Fallback and IMS" May 11, 2009, pp. 1-6, XP002604555 3GPP TSG SA WG2 Meeting 73, Tallinn, Estonia Retrieved from the Internet: URL: http://fwww.3gpp.com/ftp/tsg_sa/WG2_Arch!TSGS2_73_Tallinn/docs/S2-093814.zip, pp. 1-6.
3rd Generation Partnership Project; Technical Specification Group Radio Access Network; Evolved Universal Terrestrial Radio Access (E-UTRA) Radio Resource Control (RRC); Protocol specification (Release 8); 3GPP Standard; 3GPP TS 36.331, Valbonne, France, vol. 8.5.0, Mar. 2009, 204 pages.
Intellectual Property Office of Japan, "Notice of Reasons for Rejection," issued in connection with application No. JP 2012-514161, mailed on Oct. 4, 2013, 9 pages.
IP Australia, "Patent Examination Report No. 1," issued in connection with application No. AU 2010254798, on May 23, 2013, 4 pages.

(56) References Cited

OTHER PUBLICATIONS

Canadian Intellectual Property Office, "Office Action," issued in connection with application No. CA 2,766,399, on Nov. 14, 2013, 2 pages.
Intellectual Property Office of China, "Office Action," issued in connection with application No. CN 201080034527.6, on Oct. 31, 2013, 24 pages.
United States Patent and Trademark Office, "Non-Final Office Action," issued in connection with U.S. Appl. No. 12/793,670, on Nov. 8, 2013, 30 pages.
Intellectual Property Office of China, "Office Action," issued in connection with application No. CN 201080034440.9, on Oct. 30, 2013, 13 pages.
United States Patent and Trademark Office, "Non-Final Office Action," issued in connection with U.S. Appl. No. 13/244,728, on Dec. 31, 2013, 52 pages.
Canadian Intellectual Property Office, "Office Action," issued in connection with application No. CA 2,764,460, on Dec. 20, 2013, 3 pages.
State Intellectual Property Office of China, "Office Action," issued in connection with application No. CN 201080034528.0, on Nov. 25, 2013, 6 pages.
Canadian Intellectual Property Office, "Office Action," issued in connection with application No. CA2,764,462, on Dec. 23, 2013, 3 pages.
United States Patent and Trademark Office, "Final Office Action," issued in connection with U.S. Appl. No. 12/813,954, on Jan. 22, 2014, 20 pages.
United States Patent and Trademark Office, "Notice of Allowance," issued in connection with U.S. Appl. No. 12/813,954, on Mar. 7, 2014, 17 pages.
United States Patent and Trademark Office, "Final Office Action," issued in connection with U.S. Appl. No. 12/793,670, on May 8, 2014, 48 pages.
United States Patent and Trademark Office, "Final Office Action," issued in connection with U.S. Appl. No. 13/244,728, on May 8, 2014, 36 pages.
United States Patent and Trademark Office, "Notice of Allowance," issued in connection with U.S. Appl. No. 13/244,744, on Jun. 11, 2014, 29 pages.
State Intellectual Property Office of China, "Office Action," issued in connection with application No. CN 201080034525.7, on Jul. 3, 2014, 6 pages.
Canadian Intellectual Property Office, "Office Action," issued in connection with application No. CA 2,802,314, on Jun. 23, 2014, 2 pages.
United States Patent and Trademark Office, "Office Action," issued in connection with U.S. Appl. No. 13/244,728, on Jul. 17, 2014, 49 pages.
United States Patent and Trademark Office, "Advisory Action," issued in connection with U.S. Appl. No. 12/793,670, on Jul. 31, 2014, 4 pages.

* cited by examiner

METHODS AND APPARATUS FOR MOBILE VOICE SERVICE MANAGEMENT

RELATED APPLICATION

This patent claims priority from U.S. Provisional Application Ser. No. 61/222,925, entitled "METHODS AND APPARATUS FOR MOBILE VOICE SERVICE MANAGEMENT" and filed on Jul. 2, 2009. U.S. Provisional Application Ser. No. 61/222,925 is hereby incorporated by reference in its entirety.

FIELD OF THE DISCLOSURE

This disclosure relates generally to mobile communications and, more particularly, to methods and apparatus for mobile voice service management.

BACKGROUND

Mobile communication networks include defined areas such as location areas, registration areas, routing areas, and tracking areas. A defined area is associated with one or more base stations to provide network access to mobile devices. To identify the defined areas to mobile devices, network devices transmit lists of the defined areas to the mobile devices in network messages. For example, a list of defined areas may be transmitted in a TRACKING AREA UPDATE response, an ATTACH response, or a ROUTING AREA UPDATE response. The list may be associated with any type of defined area, including a LOCATION AREA identity list, TRACKING AREA IDENTITY list, or a ROUTING AREA IDENTITY list.

DETAILED DESCRIPTION

Figure 1:
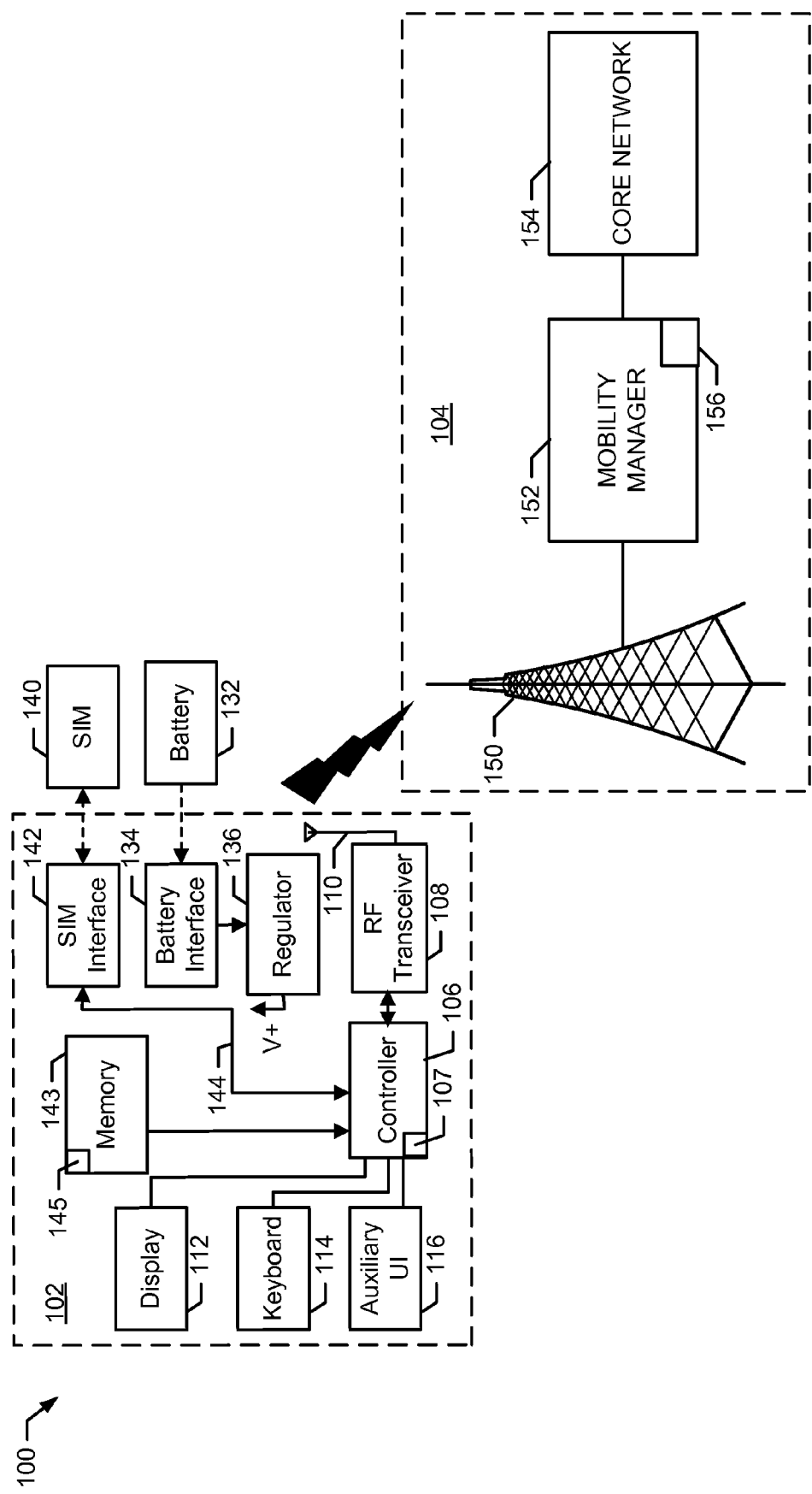
FIG. 1 is a block diagram of an example communication system.

An example mobility management apparatus described herein includes hardware and software stored on a tangible computer readable medium that during operation cause the mobility management apparatus to acquire identification of a tracking area, determine whether or not the tracking area supports voice over internet protocol multimedia subsystem service, add the tracking area to a tracking area identity list based on the determination, and store the tracking area identity list.

Another example mobile station includes hardware and software stored on a tangible computer readable medium that during operation cause the mobile station to receive a tracking area identity list identifying a first tracking area and a second tracking area, determine if the mobile station is in the second tracking area, the mobile station having previously performed a tracking area update in the first tracking area, when the mobile station is in the second tracking area, send a TRACKING AREA UPDATE, and receive a TRACKING AREA UPDATE ACCEPT that includes an indication of whether or not the second tracking area supports voice over internet protocol multimedia subsystem service.

Another example mobile station includes hardware and software stored on a tangible computer readable medium that during operation cause the mobile station to receive a tracking area identity list identifying a first tracking area and a second tracking area, determine if a mobile station is in the second tracking area, the mobile equipment having previously performed a tracking area update in the first tracking area, when the mobile station is in the second tracking area, send a TRACKING AREA UPDATE including an active flag set to true, and receive a TRACKING AREA UPDATE ACCEPT that includes an indication of whether or not the second tracking area supports voice over internet protocol multimedia subsystem service.

An example mobility management apparatus described herein includes hardware and software stored on a tangible computer readable medium that during operation cause the mobility management apparatus to acquire identification of routing area, determine whether the routing area supports voice over internet protocol multimedia subsystem service, add the routing area to a routing area identity list based on the determination, and store the routing area identity list.

Another example mobile station includes hardware and software stored on a tangible computer readable medium that during operation cause the mobile station to receive a neighbor cell list identifying a neighbor cell, monitor the neighbor cell, receive a system information block from the neighbor cell, the system information block including an identifier to indicate whether or not the neighbor cell supports voice over internet protocol multimedia subsystem service, and move the mobile station to the neighbor cell based on the identifier.

Another example mobile station includes hardware and software stored on a tangible computer readable medium that during operation cause the mobile station to determine that a tracking area in which the mobile station is located does not support voice over internet protocol multimedia subsystem service, based on the determination, determine whether or not a routing area corresponding to the tracking area supports voice over internet protocol multimedia subsystem service, and move to the routing area when the routing area corresponding to the tracking area supports voice over internet protocol multimedia subsystem service.

Another example mobile station includes hardware and software stored on a tangible computer readable medium that during operation cause the mobile station to receive a TRACKING AREA UPDATE ACCEPT while in a tracking area, the TRACKING AREA UPDATE ACCEPT including a first identifier indicating that the tracking area does not support voice over internet protocol multimedia subsystem support and a second identifier indicating that a routing area corresponding to the tracking area supports voice over internet protocol multimedia subsystem support, and based on the first identifier and the second identifier, move to the routing area.

Another example mobile station includes hardware and software stored on a tangible computer readable medium that during operation cause the mobility management apparatus to acquire identification of a tracking area, determine whether or not the tracking area supports voice over internet protocol multimedia subsystem service, add the tracking area to a tracking area identity list, add an identifier indicating whether or not the tracking area supports voice over internet protocol multimedia subsystem service to the tracking identity list based on the determination, and store the tracking area identity list.

In FIG. 1, a block diagram of an example communication system 100 implemented as described herein to allow management of mobile voice services is illustrated. According to the illustrated example, a mobile station 102 communicates with a wireless communication network 104. As described in detail herein, the mobile station 102 includes functionality to determine when the wireless communication network 104 supports a communication services such as voice over internet protocol multimedia subsystem (VoIMS). Additionally or alternatively, as described in detail herein, the mobile communication network 104 includes functionality to inform the mobile station 102 of the capabilities of the mobile communication network 104 such as, for example, the ability to support VoIMS. Some implementations of the example communication system 100 allow the mobile station 102 to know the capabilities of connected communication networks as the mobile station 102 roams throughout a mobile communication system. While the example methods and apparatus described herein provide indications of support for the VoIMS service, the example methods and apparatus may additionally or alternatively provide indications of support for any other type of service such as, for example, voice over long term evolution (LTE) via generic access (VoLGA) or enhanced High Rate Packet Data (eHRPD) system.

The example mobile station 102 includes a visual display 112, a keyboard 114, and perhaps one or more auxiliary user interfaces (UI) 116, each of which are coupled to a controller 106. The controller 106 is also coupled to a radio frequency (RF) transceiver circuitry 108, which is further coupled to an antenna 110. In one example, the controller 106 is implemented using a central processing unit (CPU) that runs operating system software stored in a memory 143. The controller 106 will normally control overall operation of mobile station 102, whereas signal processing operations associated with communication functions are typically performed by the RF transceiver circuitry 108. The controller 106 interfaces with the display 112 to present received information, stored information, user inputs, and the like.

The example controller 106 includes a VoIMS network support manager (VNSM) 107 that manages recognition of the VoIMS capabilities of communication networks (e.g., the mobile communication network 104) in communication with the mobile station 102. The example VNSM 107 enables the mobile station 102 track the VoIMS capabilities of cells as the mobile station 102 moves throughout a communication network. The VNSM 107 may operate in conjunction with a VoIMS memory block 145, which is described below. Example methods and apparatus to implement the VNSM 107 are described in conjunction with FIGS. 7a-16 and 19-20.

The keyboard 114, which may be a telephone type keypad or full alphanumeric keyboard, is normally provided for entering data for storage in the mobile station 102, information for transmission to the network 104, a telephone number to place a telephone call, commands to be executed on the mobile station 102, and possibly other or different user inputs.

Mobile station 102 sends communication signals to, and receives communication signals from the network 104 over a wireless link via the antenna 110. The RF transceiver circuitry 108 performs, for example, modulation/demodulation, encoding/decoding, and encryption/decryption. It will be apparent to those skilled in art that RF transceiver circuitry 108 will be adapted to particular wireless network or networks in which mobile station 102 is intended to operate.

The mobile station 102 further includes a battery interface 134 for receiving one or more rechargeable batteries 132. The battery 132 provides power to electrical circuitry in mobile station 102, and the battery interface 134 provides for a mechanical and electrical connection for the battery 132. The battery interface 134 is coupled to a regulator 136 that regulates power V+ to the device. When the mobile station 102 is operational, an RF transmitter of the RF transceiver circuitry 108 is typically keyed or turned on only when it is sending information to the network, and is otherwise turned off to conserve resources. Similarly, an RF receiver of the RF transceiver circuitry 108 is typically periodically turned off to conserve power until it is needed to receive signals or information (if at all) during designated time periods.

The mobile station 102 operates using a Subscriber Identity Module (SIM) 140 that is connected to or inserted in the mobile station 102 at a SIM interface 142. Without the SIM 140, the mobile station 102 may be referred to as mobile equipment (ME); with the SIM 140, the mobile station 102 may be referred to as user equipment (UE) The SIM 140 is one type of a removable memory module or "smart card" used to identify an end user of mobile station 102 (or subscriber) and to personalize the device, among other things. Without the SIM 140, the example mobile station 102 is not fully operational for communication through the wireless communication network 104. By inserting the SIM 140 into the mobile station 102, an end user can have access to any and all of his/her subscribed services.

The SIM 140 generally includes a processor and memory for storing information. Because the SIM 140 is coupled to the SIM interface 142, it is coupled to the controller 106 through communication lines 144. To identify the subscriber, the SIM 140 contains some user parameters such as an International Mobile Subscriber Identity (IMSI). An advantage of using the SIM 140 is that end users are not necessarily bound by any single physical mobile station because the SIM 140 may be used in any number of different mobile stations. The SIM 140 may store additional user information for the mobile station 102 as well, including datebook (or calendar) information, recent call information, and network connection information.

The mobile station 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the mobile station 102 may be a multiple-module unit comprising a plurality of separate components, including but in no way limited to a computer or other device connected to a wireless modem. In particular, for example, in the mobile station block diagram of FIG. 1, the RF transceiver circuitry 108 and antenna 110 may be implemented as a radio modem unit that may be inserted into a port on a laptop computer. In this case, the laptop computer would include the display 112, keyboard 114, one or more auxiliary UIs 116, and the controller 106 may be the computer's CPU. It is also contemplated that a computer or other equipment not normally capable of wireless communication may be adapted to connect to and effectively assume control of the RF transceiver circuitry 108 and the antenna 110 of a single-unit device such as one of those described above.

The mobile station 102 communicates in and through the wireless communication network 104, which may be a cellular telecommunications network. In the example of FIG. 1, the wireless network 104 is configured in accordance with the LTE technology. The wireless network 104 may be configured according to any communication technology including, for example, universal mobile telecommunications system (UMTS), worldwide interoperability for microwave access (WiMAX), code division multiple access (CDMA), General Packet Radio Service (GPRS), Global Systems for Mobile (GSM), enhanced data rates for GSM evolution (EDGE), GSM EDGE (GERAN), etc.

The wireless communication network 104 includes a tower station 150, a mobility manager 152 that includes a VoIMS support manager (VSM) 156, and a core network 154.

The tower station 150 is a fixed transceiver station, and the tower station 150 may be referred to as transceiver equipment. The transceiver equipment includes for example, an antenna and a transceiver station node such as, for example an enhanced Node B (eNode B) in an LTE implementation, a Node B and/or a radio network controller (RNC) in a UMTS implementation, a base transceiver station (BTS) and/or a base station controller (BSC) in a GERAN implementation, etc. The transceiver equipment provides wireless network coverage for a particular coverage area commonly referred to as a "cell." A group of cells may form a location area (LA), a tracking area (TA) or a routing area (RA). The transceiver equipment transmits communication signals to, and receives communication signals from, the mobile station 102 within its cell via tower station 150. The transceiver equipment normally performs such functions as modulation and possibly encoding and/or encryption of signals to be transmitted to the mobile station 102 in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between the wireless network 104 and the mobile station 102. An RF channel is a limited resource that must be conserved, typically due to limits in overall bandwidth and a limited battery power of the mobile station 102. A wireless network may include hundreds of cells, each served by a tower station 150 (i.e. or station sector), depending upon desired overall expanse of network coverage. All pertinent components may be connected by multiple switches and routers (not shown), controlled by multiple network controllers.

The mobility manager 152 manages communications between the mobile station 102 (via the tower station 150) and the core network 154. For example, the mobility manager 152 manages signaling, tracking, and paging of the mobile station 102, activation and deactivation of radio bearers for the mobile station 102, authentication of a user of the mobile station 102, etc. The mobility manager 152 of the illustrated example is a mobility management entity (MME) for an LTE network. However, the mobility manager 152 may be any type of mobility manager such as, for example, a serving GPRS support node (SGSN) for a UMTS, etc.

The example mobility manager 152 includes the VSM 156 to manage indication to the mobile station 102 of VoIMS support of the wireless communication network 104. For example, the mobility manager 152 may indicate to the mobile station 102 that a first tracking area supports VoIMS while a second tracking area does not support VoIMS. Example methods and apparatus to implement the VSM 156 are described in conjunction with FIGS. 4a, 4b, 5a, 6a, 6b, and 17-18.

The core network 154 of the illustrated example is the central part of the wireless communication network 104 that provides services to the mobile station 102 via the mobility manager 152 and the tower station 150. For example, the core network 154 may support one or more of VoIMS, VoLGA, packet switched (PS) communications, circuit switched (CS) communications, etc. The core network 154 may include any components needed for providing such services such as components for authentication, gateways to other networks, communication control and switching components, accounting components, service invocation and management components, etc.

In operation, the mobile station 102 makes its presence known to wireless network 104 by performing what is known as an ATTACH operation. This operation establishes a logical link between the mobile station 102 and the mobility manager 152 and makes the mobile station 102 available to receive, for example, pages via the mobility manager 152, notifications of incoming data, SMS messages, etc. In order to send and receive data, the mobile station 102 assists in activating a packet data address that it wants to use. This operation makes mobile station 102 known to a packet gateway within the core network 154; interworking with external data networks can thereafter commence. User data may be transferred transparently between the mobile station 102 and the external data networks using, for example, encapsulation and tunneling.

A wireless network may be connected to other systems, possibly including other networks, not explicitly shown in FIG. 1. A network may transmit some sort of paging and system information on an ongoing basis, even if there is no actual packet data exchanged. Although the network consists of many parts, these parts all work together to result in certain behaviors at the wireless link.

Figure 2:
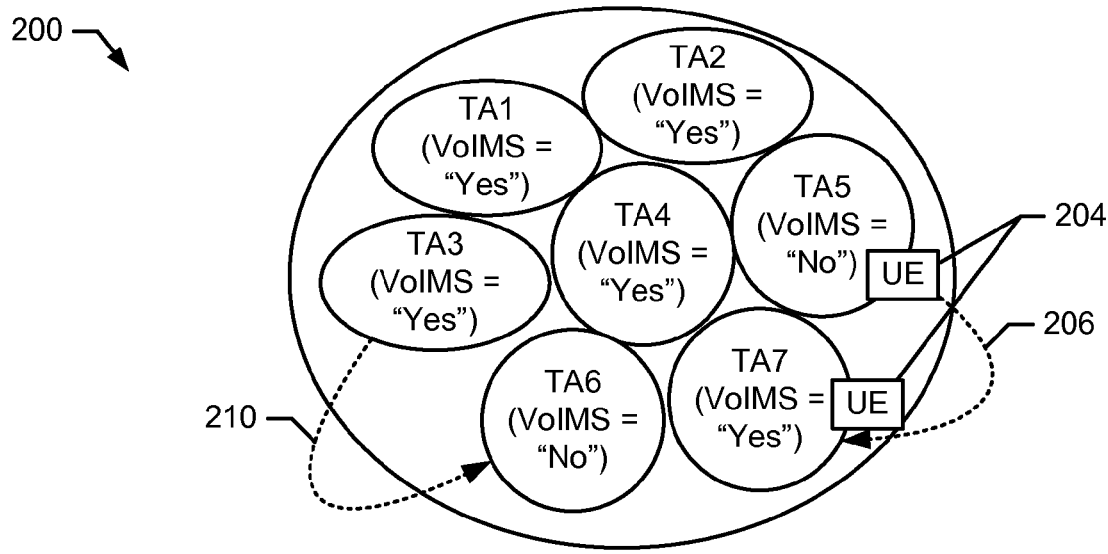
FIG. 2 is a block diagram of a communication network in which a user equipment (UE) may operate.

FIG. 2 is a block diagram of a communication network 200 in which a UE 204 may operate. The example communication network 200 includes several tracking areas TA1-TA7 that each comprises one or more cells (not shown). As described in above it is understood that the tracking areas TA1-TA7 could alternatively be routing areas (RAs) or location areas (LAs). The tracking areas TA1-TA7 are associated with each other by their identification on a tracking area identity (TAI) list that may be provided to the UE 204 by a mobility manager (e.g., the mobility manger 152 of FIG. 1) or any other network component. As shown in the example communication network 200, the tracking areas TA1-TA7 on a TAI list may not support all of the same services. For example, tracking areas TA5 and TA6 do not support VoIMS while tracking areas TA1-TA4, and TA7 support VoIMS.

When the UE 204 first connects with a network (e.g., inside tracking area TA5), the UE 204 initiates an ATTACH procedure and receives an ATTACH ACCEPT response when the network has agreed to initiate a connection with the UE 204. The ATTACH ACCEPT response includes an indication of the support capabilities of the tracking area in which the UE 204 is located (e.g., tracking area TA5). Likewise, when the UE 204 moves from a tracking area on a previous TAI list (not shown) to tracking area TA5 not belonging to such previous TAI list, the UE 204 will perform a TRACKING AREA UPDATE (TAU) procedure. The network will respond with a TAU ACCEPT that includes an indication of the support capabilities of the tracking area in which the UE 204 is located (e.g., tracking area TA5). For example, 3GPP documents S2-094238, S2-094147, C1-092354, S2-094179, C1-092353, C1-092354, and C1-092867 describe example implementations of indications of VoIMS support that may be provided to the UE 204.

According to the illustrated example, when the UE 204 moves through tracking areas that belong to the same TAI list, the tracking area to which the UE 204 moved may support different services than the tracking area in which the UE 204 was previously located. For example, when the UE 204 moves from TA5 to TA7 as illustrated by label 206, the UE 204 will move from a tracking area TA5 that does not support VoIMS to a tracking area TA7 that supports VoIMS. Accordingly, if the UE 204 does not recognize that the tracking area TA7 supports VoIMS, the UE 204 may be inside of a tracking area that supports VoIMS, but will not take advantage of this service. For example, the UE 204 may not recognize the capabilities of tracking area TA7 if the UE 204 received an indication that VoIMS was not supported when the UE 204 was connected to the tracking area TA5 and the UE 204 does not receive an update when moving to tracking area TA7. Likewise, the UE 204 may move from a tracking area TA3 that supports VoIMS to a tracking area TA6 that does not support VoIMS as indicated by label 210. In 210, the UE 204 may not appropriately account for the loss of VoIMS support (e.g., by realizing voice services by a different method such as: using circuit switched fall back (CSFB), using VoLGA, etc.) when moving to tracking area TA6 if the UE 204 does not receive an indication that TA6 does not support VoIMS.

To recognize VoIMS support while the UE 204 moves through tracking areas in a TAI list, the UE 204 may be implemented as described in conjunction with FIG. 1. Accordingly, the UE 204 may include the VNSM 107 to enable the UE 204 to be apprised of the VoIMS support of tracking areas as the UE 204 moves throughout the communication network 200. Additionally or alternatively, the communication network 200 may be implemented by the wireless communication network 104 of FIG. 1 to provide VoIMS support indications to the UE 204 as the UE 204 moves throughout the communication network 200. Accordingly, when, for example, the UE 204 moves from the tracking area TA5 to the tracking area TA7 that UE 204 will know that the tracking area TA7 supports VoIMS and can utilize VoIMS when desired.

Figure 3:
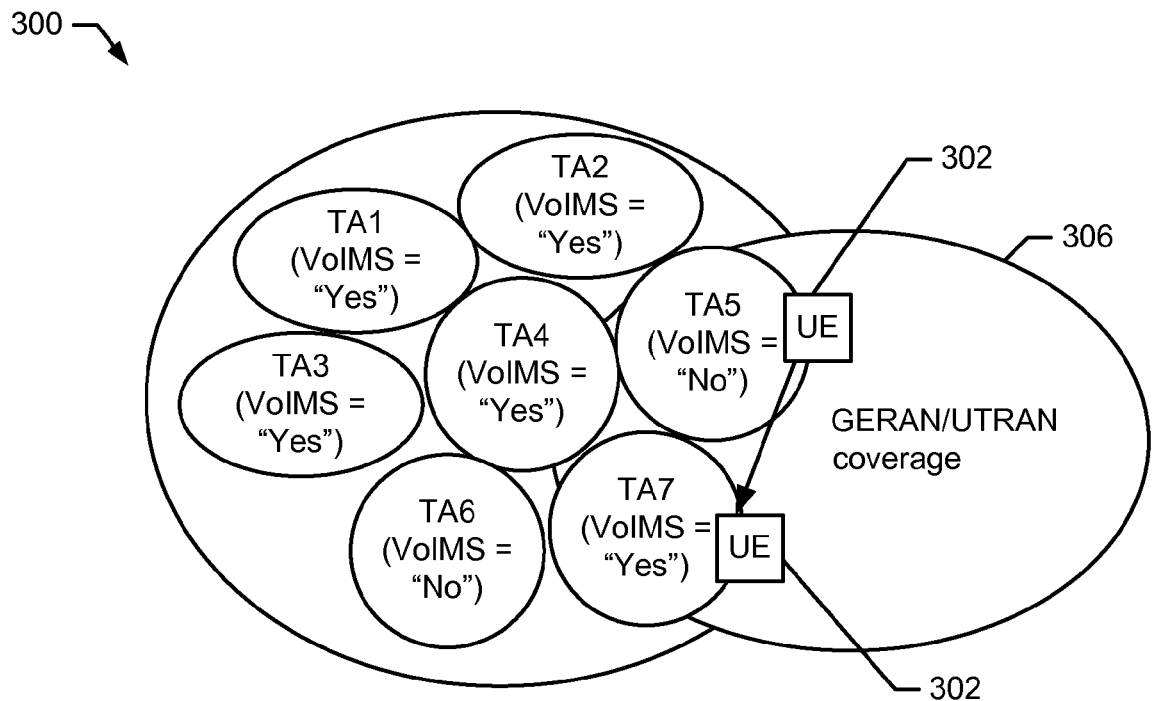
FIG. 3 is a block diagram of a communication network in which a UE may operate.

FIG. 3 is a block diagram of a communication network 300 in which a UE 302 may operate. Like FIG. 2, the example communication network 300 includes several tracking areas TA1-TA7 that each comprises one or more cells (not shown). The tracking areas TA1-TA7 are associated with each other by their identification on a tracking area identity (TAI) list that may be provided to the UE 302 by a mobility manager (e.g., the mobility manger 152 of FIG. 1) or any other network component. As shown in the example communication network 300, the tracking areas TA1-TA7 on a TAI list may not support all of the same services. For example, tracking areas TA5 and TA6 do not support VoIMS while tracking areas TA1-TA4, and TA7 support VoIMS.

The example communication network 300 also includes GERAN and/or UTRAN coverage 306 that overlaps with tracking areas TA4, TA5, and TA7. Accordingly, in areas with overlapping coverage, the UE 302 may elect to communicate using LTE or may elect to communicate using GERAN and/or UTRAN systems. For example, if the UE 302 is camped in LTE and is in the coverage of LTE tracking area TA5 and receives an indication that VoIMS support is not available, the UE 302 may elect to connect to the GERAN and/or UTRAN system to initiate CS voice communication. Alternatively, if the UE 302 is camped on the GERAN and/or UTRAN system and determines that it is within coverage of LTE tracking area TA7 and VoIMS is supported in that tracking area, the UE 302 can connect to a LTE cell in tracking area TA7 to initiate a VoIMS communication session.

The UE 302 may be implemented by the apparatus described in conjunction with FIG. 1. Accordingly, the UE 302 may include the VNSM 107 to enable the UE 302 to be apprised of the VoIMS support of tracking areas as the UE 204 moves throughout the wireless communication network 104. Additionally or alternatively, the communication network 300 may be implemented by the wireless communication network 104 of FIG. 1 to provide VoIMS support indications to the UE 302 as the UE 302 moves throughout the wireless communication network 104. Accordingly, when, for example, the UE 204 moves from the tracking area TA5 to the tracking area TA7 that UE 302 will know that the tracking area TA7 supports VoIMS and can utilize VoIMS when desired.

Block diagrams of apparatus and flowcharts representative of example processes that may be executed to implement some or all of the elements of the system 100 and mobile communication devices described herein are shown in FIGS. 4a-20.

In these examples, the process represented by each flowchart may be implemented by one or more programs comprising machine readable instructions for execution by: (a) a processor, such as the microprocessor 2112 shown in the example computer 2100 discussed below in connection with FIG. 21, (b) a controller, such as the controller 106 of FIG. 1, and/or (c) any other suitable device. The one or more programs may be embodied in software stored on a tangible medium such as, for example, a flash memory, a CD-ROM, a floppy disk, a hard drive, a DVD, or a memory associated with the processor 2112, but the entire program or programs and/or portions thereof could alternatively be executed by a device other than the microprocessor 2112 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any combination of software, hardware, and/or firmware. Also, some or all of the processes represented by the flowcharts of FIGS. 4a-20 may be implemented manually.

Further, although the example processes are described with reference to the flowcharts illustrated in FIGS. 4a-20, many other techniques for implementing the example methods and apparatus described herein may alternatively be used. For example, with reference to the flowcharts illustrated in FIGS. 4a-20, the order of execution of the blocks may be changed, and/or some of the blocks described may be changed, eliminated, combined, and/or subdivided into multiple blocks. Any of the described blocks may be as implemented as part of an existing system. For example, blocks may be implemented as part of a mobility manager such as a mobility management entity of an LTE system or may be implemented as a part of a mobile station, etc. While the example block diagrams are described as implementing the processes of the flowcharts, the apparatus of the block diagrams may implement any process and, likewise, the processes of the flowcharts may be implemented by any apparatus, device, system, software, or combination thereof.

Determining, as used herein, may be any type of process for identifying a particular result and is not limited to a computational or analysis process. For example, determining may involve reading an indicator, flag, register, variable, identifier, etc. to determine whether a service is supported. In another example, determining may involve querying, extracting, computing, calculating, etc. to determine a result.

Figure 4A:
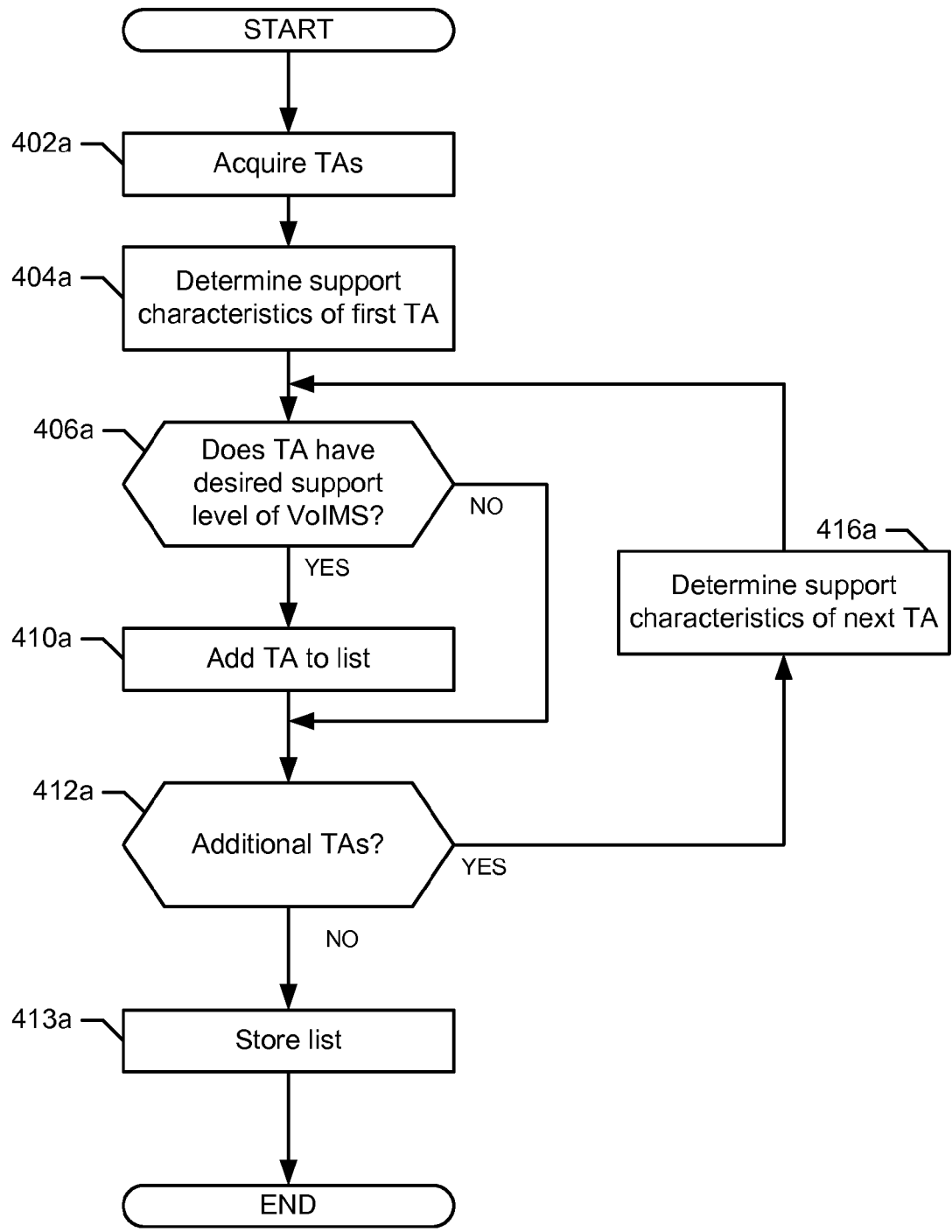
FIG. 4a is a flowchart of an example process to store a TAI list of TAs that support VoIMS.
Figure 5A:
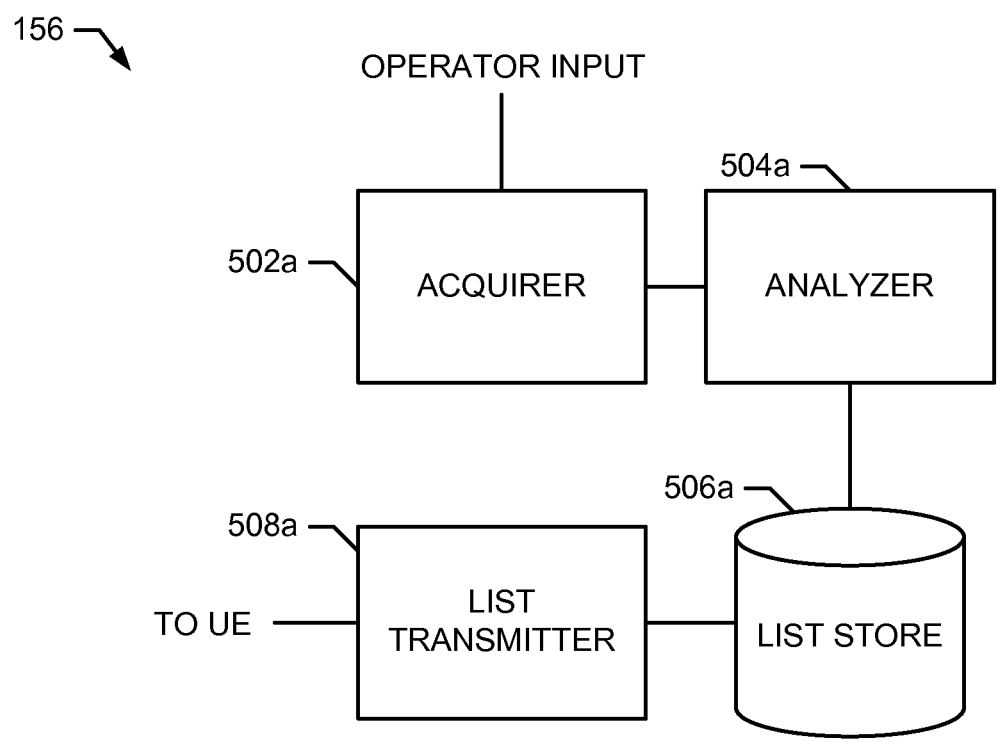
FIG. 5a is a block diagram of an example VSM that may implement the processes of FIGS. 4a, 4b, 6a, and/or 6b.

FIG. 4a is a flowchart of an example process that may be implemented by the example implementation of the VSM 156 illustrated in FIG. 5a to create a TAI List and to provide this TAI list to a UE (e.g., the mobile station in FIG. 1). The example TAI list may include only TAs that support a specific service (e.g. only TAs that support VoIMS service, or only TAs that do not support VoIMS service). The example VSM 156 of FIG. 5a includes an acquirer 502a, an analyzer 504a, a list store 506a, and a list transmitter 508a.

The example of FIG. 4a illustrates an example implementation in which VSM 156 of FIG. 5a generates a TAI list of TAs that support VoIMS service. Alternatively, a TAI list of TAs that do not support VoIMS service, a TAI list of TAs that support VoLGA service, a TAI list of TAs that do not support VoLGA service, or a TAI list of TAs that support or do not support any other service or combination of services may be generated. of The example process of FIG. 4a begins when the receiver 502a acquires information about one or more TAs (block 402a). For example, the receiver 502a may acquire information about TAs, from a message transmitted to the receiver 502a via a network, etc. Then, the analyzer 504a selects the first TA received and analyzes the support characteristics of the TA (block 404a). For example, the analyzer 504a may analyze operator input information about the TA to determine what services the TA supports. The example analyzer 504a determines if the selected TA supports VoIMS (block 406a). When the TA does not support VoIMS, control proceeds to block 412a.

When the TA supports VoIMS (block 406a), the analyzer 504a adds the TA to a TAI list stored in the list store 506a (block 410a). The list store 506a may be any type of data structure or device capable of storing a TAI list such as, for example, a database, a tangible memory, a register, a temporary memory, etc. Control then proceeds to block 412a.

Turning to block 412a, the analyzer 504a determines if there are additional TAs to be analyzed for possible additions to the TAI list. When there are additional TAs to be analyzed, the analyzer 504a determines the support characteristics of the next TA (block 416a) and control returns to block 406a. If there are no further TAs to be analyzed, the list store 506a stores the TAI list (block 413a). The list may be stored in a memory until the list is ready to be transmitted. An example process for transmitting the list is described in conjunction with FIG. 4d.

Figure 4B:
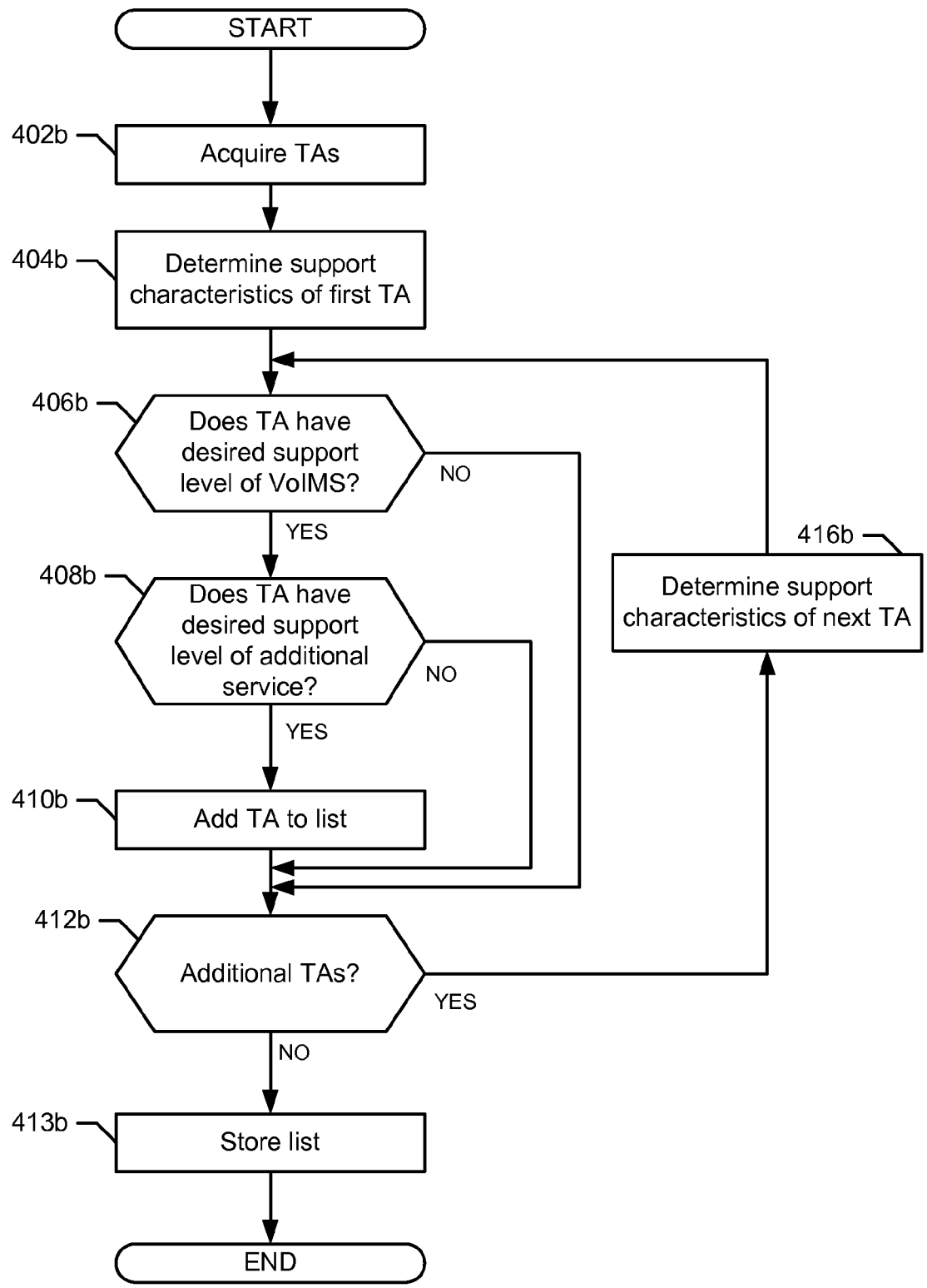
FIG. 4b is a flowchart of an example process to store a TAI list of TAs that support VoIMS and one or more additional services.

FIG. 4b is a flowchart of an example process that may be implemented by the example implementation of the VSM 156 illustrated in FIG. 5a to create a TAI list and to provide this TAI list to a UE (e.g., the mobile station in FIG. 1). The example TAI list may include only TAs that support the same level of one of more services (e.g., TAs that support VoIMS and VoLGA, etc.).

The example process of FIG. 4b begins when the receiver 502a acquires information about one or more TAs (block 402b). For example, the receiver 502a may acquire information about TAs from an operator input, from a message transmitted to the receiver 502a via a network, etc. Then, the analyzer 504a selects the first TA received and analyzes the support characteristics of the TA (block 404b). For example, the analyzer 504a may analyze operator input information to determine what services are supported by the TA. The example analyzer 504a determines if the selected TA supports VoIMS (block 406b). When the TA does not support VoIMS, control proceeds to block 412b.

When the TA supports VoIMS (block 406b), the analyzer 504a may determine if the TA supports additional desired services (block 408b). For example, if the TAI list to be generated is for TAs that support VoIMS and VoLGA, the analyzer 504a may determine in block 408b if the selected TA supports VoLGA. When the TA does not support additional desired services, control proceeds to block 412b.

When the TA supports additional desired services (block 408b), the analyzer 504a adds the TA to a TAI list stored in the list store 506a (block 410b). The list store 506a may be any type of data structure or device capable of storing a TAI list such as, for example, a database, a tangible memory, a register, a temporary memory, etc. Control then proceeds to block 412b.

Turning to block 412b, the analyzer 504a determines if there are additional TAs to be analyzed for possible additions to the TAI list. When there are additional TAs to be analyzed, the analyzer 504a determines the support characteristics of the next TA (block 416b) and control returns to block 406b. At some time after there are no further TAs to be analyzed, the list store 506a stores the TAI list (block 413b). An example process for transmitting the list to a UE is described in conjunction with FIG. 4d.

Figure 4C:
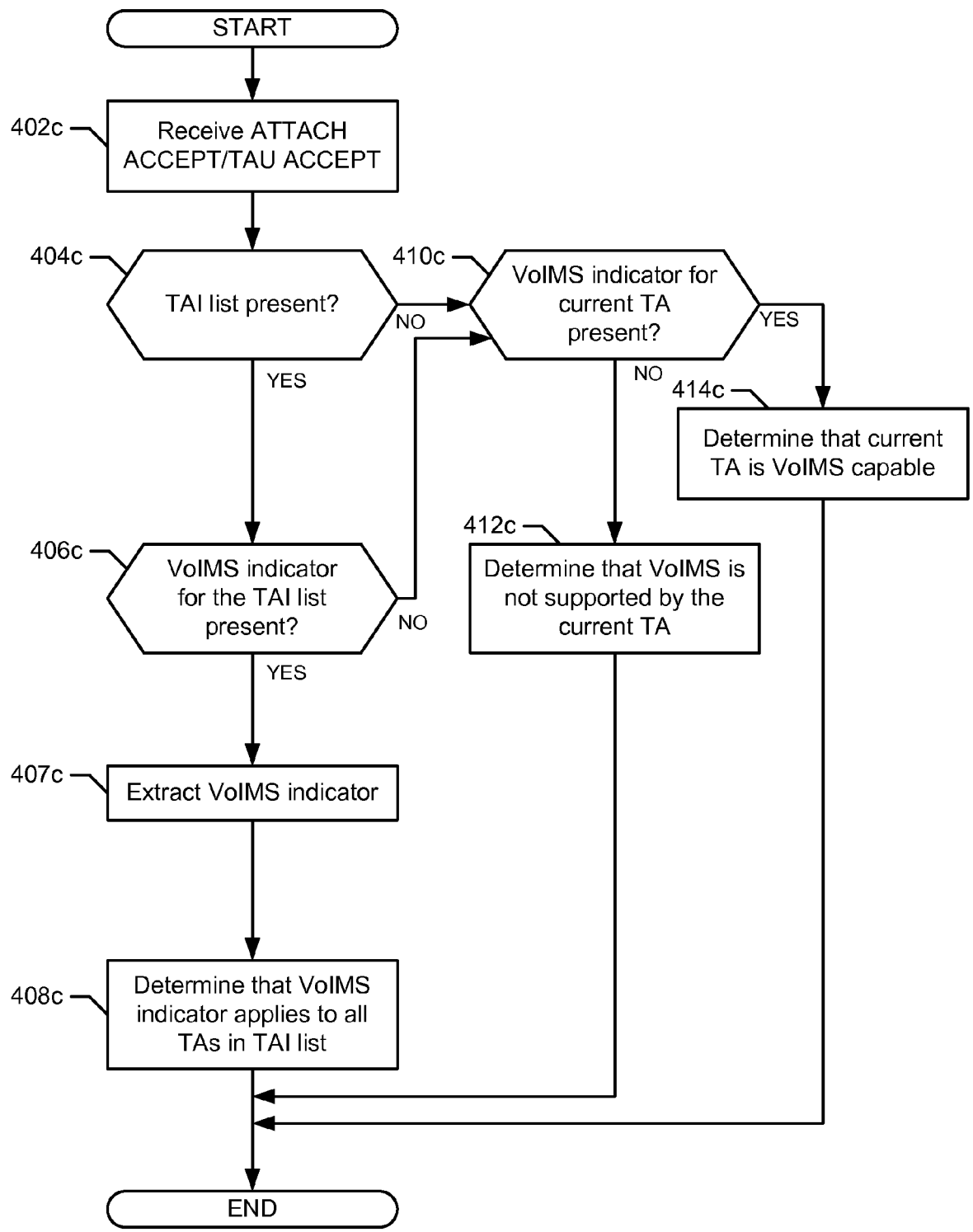
FIG. 4c is a flowchart of an example process to receive a TAI list at a UE.
Figure 4E:
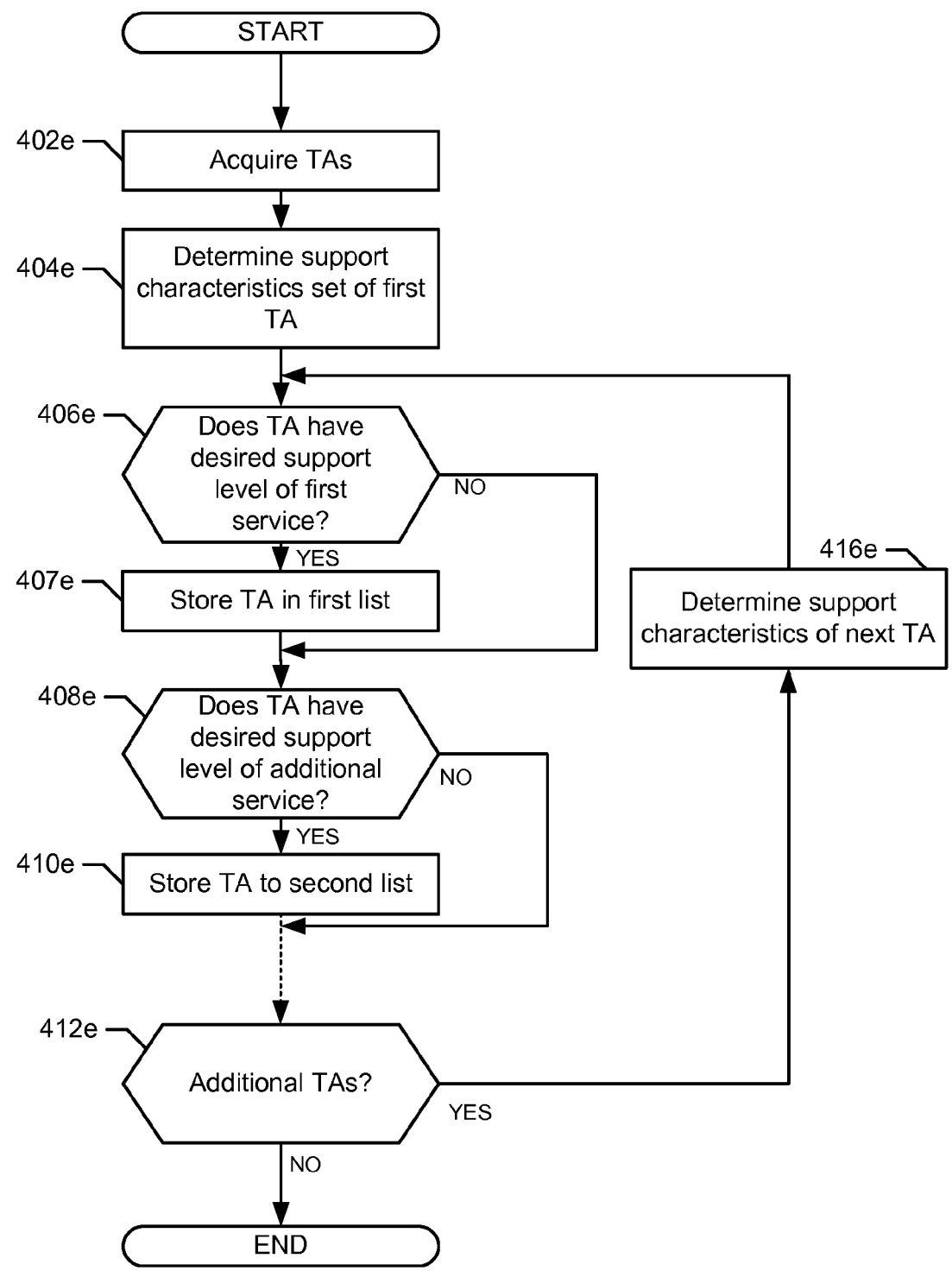
FIG. 4e is a flowchart of an example process to store a TAI list of TAs that support VoIMS and one or more additional services.
Figure 5B:
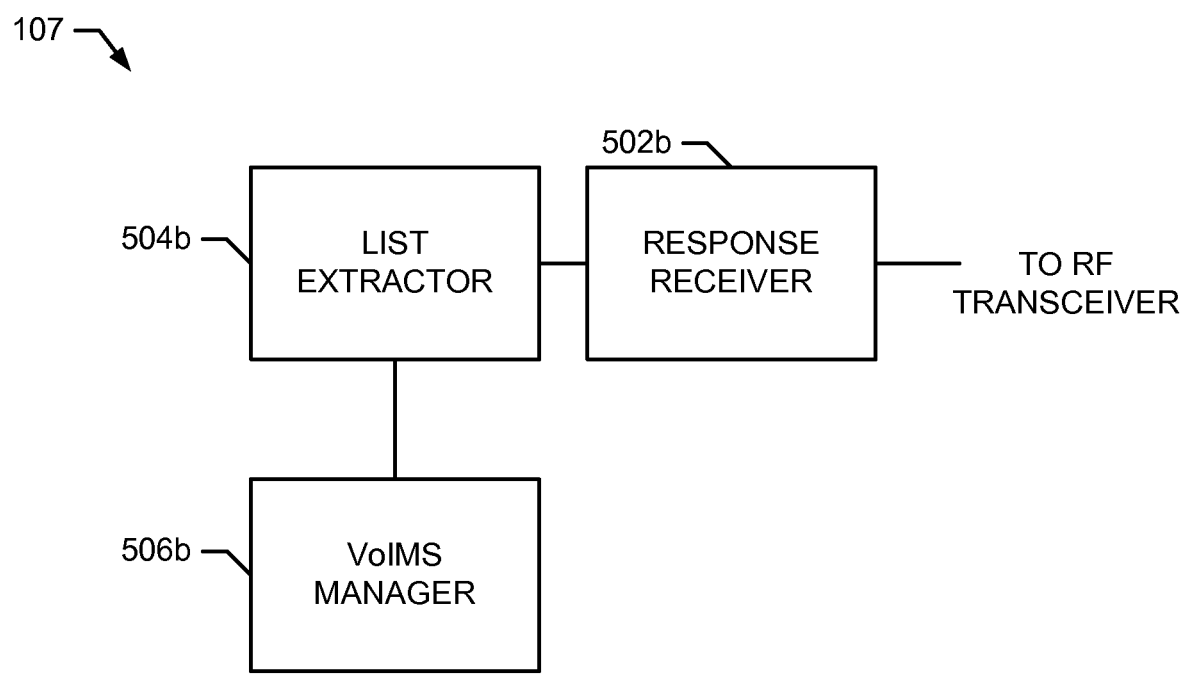
FIG. 5b is a block diagram of an example VNSM that may implement the process of FIG. 4c.

FIG. 4c is a flowchart of an example process that may be implemented by the example implementation of the VNSM 107 illustrated in FIG. 5b to receive one or more TAI lists at a UE (e.g., the mobile station in FIG. 1). The example TAI lists may include, for example, only TAs that support the same specific service (e.g., TAs that support VoIMS, TAs that support VoLGA, etc. as described in conjunction with FIGS. 4a and 4e and VoLGA, etc.) as is described in conjunction with FIG. 4b.) The VNSM 107 of FIG. 5b includes a response receiver 502b, a list extractor 504b, and a VoIMS manager 506b. While the description of FIG. 4c and other FIGS. references a VoIMS manager, any type of service manager specific to a particular service or general to all services may be used. Therefore, when VoIMS manager is used, it should be understood that any service manager may be implemented.

The process of FIG. 4c begins when the response receiver 502b receives a response to a network request (block 402c). For example, the response may be an ATTACH ACCEPT received in response to an ATTACH request, a TAU ACCEPT received in response to a TAU request, a RAU ACCEPT received in response to a RAU request, etc. While the following description references TAs and TAI lists, the process and apparatus may be used with RAs and RAI lists or any other type of area or list. The example TAI list extractor then determines if a TAI list is present in the response to the network request (block 404c). When a TAI list is not present in the response to the network request, control proceeds to block 410c, which is described below.

When a TAI list is present in the response to the network request (block 404c), the VoIMS manager 506b determines if a VoIMS indicator is present in the TAI list that was sent in response to the network request (block 406c). When a VoIMS indicator is not present in the response to the network request, control proceeds to block 410c.

When a VoIMS indicator is present in the response to the network request (block 406c), the VoIMS manager 506b extracts the VoIMS indicator from a TAI/RAI list or from an information block of the response (block 407c). The VoIMS manager 506b then determines that the VoIMS indicator applies to all TAs in the received TAI list (block 408c). For example, the VoIMS indicator may conclude that when VoIMS indicator is included in a network response when the network response includes a TAI/RAI list, the VoIMS indicator applies to all TAs/RAs on the TAI/RAI list. Alternatively, when the TAI/RAI list includes an indication of VoIMS support, the VoIMS support will be concluded to apply to all TAs/RAs on the list. Based on the determination, the UE is informed that it may, for example, move throughout the TAs on the TAI list and know that the TAs either support or do not support VoIMS as indicated by the VoIMS indicator. The response to the network request may include additional service support indicators that may be extracted and analyzed. The VoIMS indication may, for example, be stored in the VoIMS memory block 145 of FIG. 1.

Returning to block 410c, after determining that the response to the network request does not include a TAI list, the VoIMS manager determines if a VoIMS indicator for the current TA is present in the response to the network request (block 410c). When a VoIMS indicator is not present, control proceeds to block 412c. When a VoIMS indicator is present, the VoIMS manager 506b determines that VoIMS is supported by the current TA (block 414c).

Turning to block 412c, after determining that the response to the network request does not include a VoIMS indicator, the VoIMS manager 506b determines that VoIMS is not supported by the current TA (block 412c).

In response to determining support characteristics of the TAs, the UE will take action to provide desired services. For example, the UE can know whether to register for VoIMS services or attempt to register for voice services using another voice solution. For example, if a UE has been instructed to initiate a voice call, the UE can know whether VoIMS service is supported by the current TA. In addition, the UE may be able to learn whether other TAs in the TAI list support VoIMS and, thus, can know if VoIMS will be supported when the UE moves to a new TA in the TAI list.

Figure 4D:
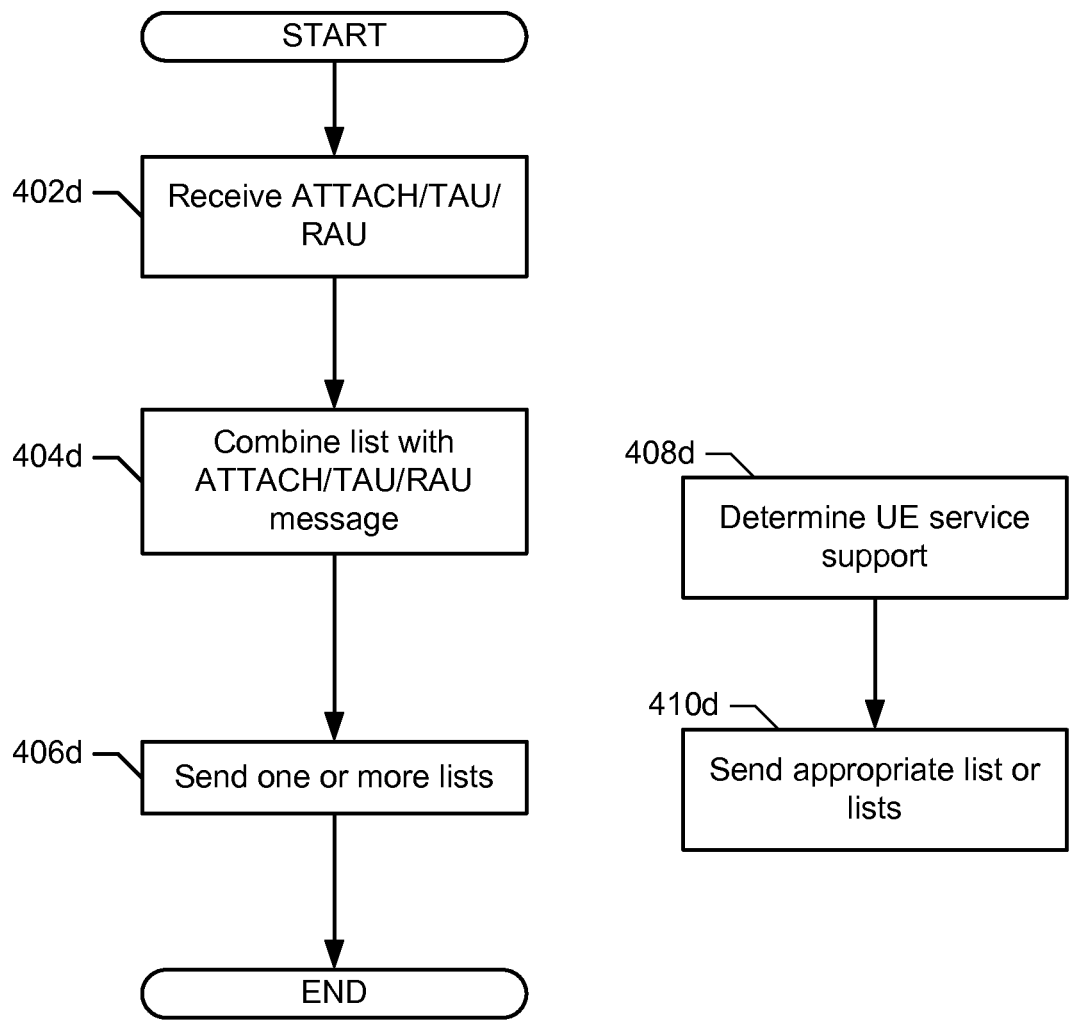
FIG. 4d is a flowchart of an example process to transmit a TAI list to a UE.

FIG. 4d is a flowchart of an example process to transmit a TAI/RAI list to a UE. The process of FIG. 4d begins when the list transmitter 508a receives a network request such as an ATTACH request, a TAU request, or a RAU request (block 402d), the list transmitter 508a combines one or more previously stored TAI/RAI lists with a network request response such as ATTACH ACCEPT, TAU ACCEPT, RAU ACCEPT response for sending to the UE (block 504d). The list transmitter 508a then transmits the ATTACH ACCEPT, TAU ACCEPT, RAU ACCEPT message to the UE that sent the ATTACH request, TAU request, RAU request (block 406d). The manner in which the list transmitter 508a transmits the one or more TAI/RAI lists may vary. In one example, the list transmitter 508a may include all previously stored TAI/RAI lists with the network request response.

In another example, the list transmitter 508a may transmit the TAI/RAI lists as shown in blocks 408d and 410d that be implemented as a part of the process shown in blocks 404d and 406d. The list transmitter 508a may first determine what services are supported by the UE that sent the network request. For example, the list transmitter 508a may receive a service identifier from the UE in the network request. The service identifier may indicate that the UE supports VoIMS service and VoLGA service. In another example, the list transmitter 508a may determine the services supported by the UE by reviewing previously stored information associated with the UE such as, for example, billing records, security records, subscription records, etc. After determining services supported by the UE, the list transmitter 508a transmits the appropriate lists for the desired services. For example, the list transmitter 508a may determine that a UE supports VoLGA, but does not support VoIMS. In that case, the list transmitter 508a may transmit a TAI/RAI list with TAs/RAs that support VoLGA and do not support VoIMS. In another example, the list transmitter 508a may transmit TAI/RAI list with TAs/RAs that support VoLGA regardless of their support for VoIMS.

FIG. 4e is a flowchart of an example process to store one or more TAI/RAI lists. The example process of FIG. 4e begins when the acquirer 502a acquires information about one or more TAs (block 402e). For example, the receiver 502a may acquire information about TAs from a message transmitted to the receiver 502a via a network, etc. Then, the analyzer 504a selects the first TA received and analyzes the support characteristics set (e.g., support level for one or more services) of the TA (block 404e). The example analyzer 504a determines if the selected TA supports a first service (block 406e). For example, the first service may be VoIMS. When the TA does not support VoIMS, control proceeds to block 408e.

When the TA supports VoIMS (block 406e), the analyzer adds the TA to a first TAI List associated with said first service and stores the first TAI list in the list store 506a (block 407e). The analyzer 504a then determines if the TA supports an additional desired service (block 408e). For example, the additional desired service may be VoLGA. When the TA does not support the additional desired services, control proceeds to block 412e. Alternatively, before proceeding to block 412e, the analyzer 504a may analyze as many other services as may be desired for addition to one or more distinct or combined TAI lists.

When the TA supports the additional desired services (block 408e), the analyzer 504a adds the TA to an additional TAI list associated with the additional service and stores the additional TAI list in the list store 506a (block 410e). As shown by the dashed line between 410e and 412e, this process may continue processing and creating lists for as many distinct services as there is support indicated for in the TA configuration set. Control then proceeds to block 412e.

Turning to block 412e, the analyzer 504a determines if there are additional TAs to be analyzed (block 412e). When the there are no additional TAs, control proceeds to block 413e.

When there are additional TAs, the analyzer 504a, determines the support characteristics of the next TA (block 416e) and control proceeds to block 406e to analyze the next TA.

Turning to block 413e, the list transmitter 508a stores the TAI lists for future delivery to UEs (block 413e). The process of FIG. 4e is executed by the network before sending the TAI List to the UE. An example process to transmit the list to a UE is described in conjunction with FIG. 4d.

Figure 6A:
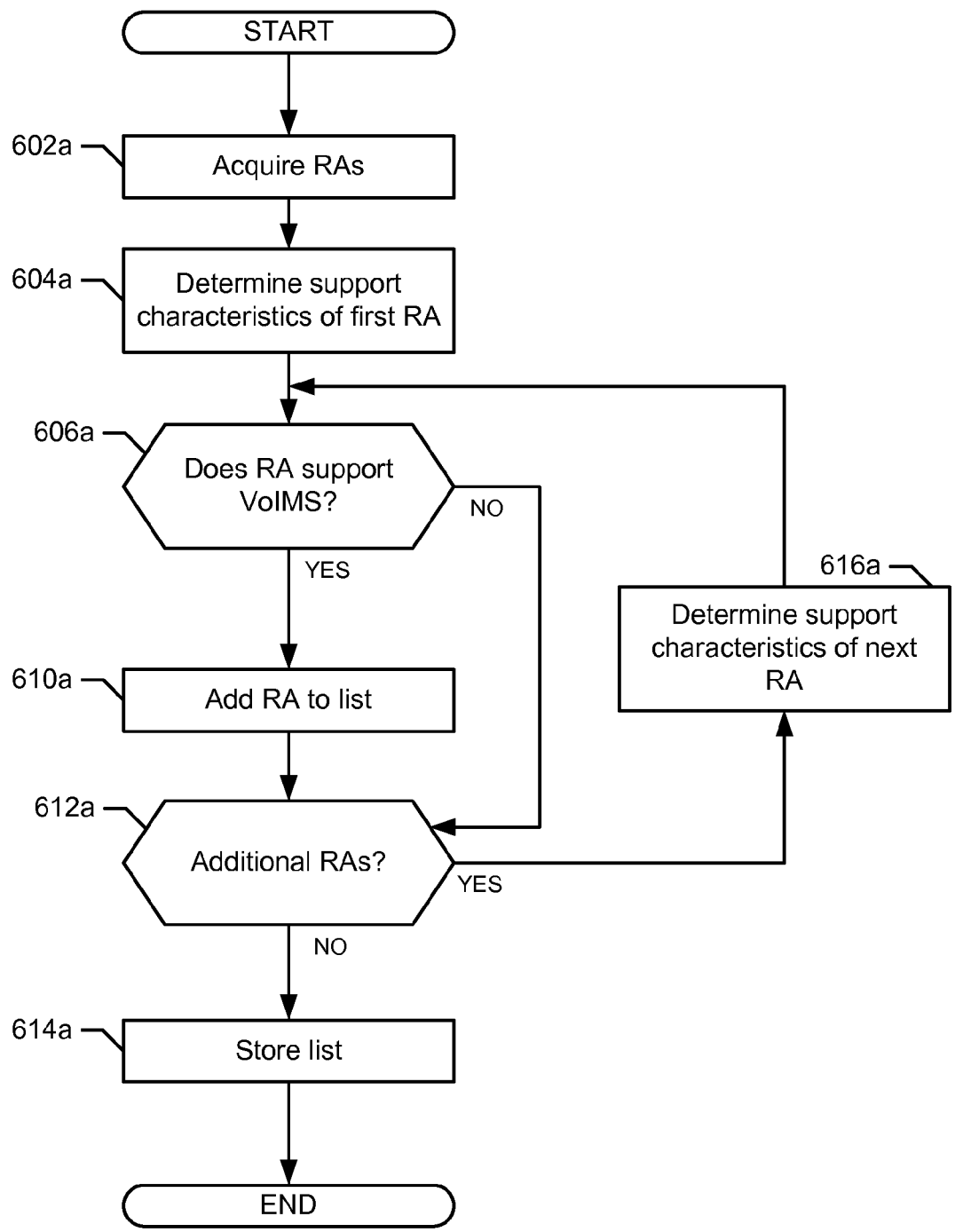
FIG. 6a is a flowchart of an example process to provide a routing area identity (RAI) list of RAs that support VoIMS to a UE in UTRAN and UMTS systems.

FIG. 6a is a flowchart of an example process that may be implemented by the example implementation of the VSM 156 illustrated in FIG. 5a to provide a routing area identifier (RAI) list to a UE (e.g., the mobile station 102) in UTRAN and UMTS systems. The example RAI list may include information about routing areas (RA)s that support the VoIMS service. The example VSM 156 of FIG. 5a includes a receiver 502a, an analyzer 504a, a list store 506a, and a list transmitter 508a.

The example process of FIG. 6a begins when the receiver 502a acquires information about one or more RAs (block 602a). For example, the receiver 502a may acquire information about RAs from an operator input from a message transmitted to the receiver 502a via a network, etc. Then, the analyzer 504a selects the first RA received and analyzes the support characteristics of the RA (block 604a). For example, the analyzer 504a may analyze operator input information for an RA to determine what services the RA supports. The example analyzer 504a determines, for example, if the selected RA supports VoIMS (block 606a). When the RA does not support VoIMS, control proceeds to block 612a.

When the RA supports VoIMS (block 606b), the analyzer 504a adds the RA to a RAI list stored in the list store 506a (block 610a). The list store 506a may be any type of data structure or device capable of storing a RAI list such as, for example, a database, a tangible memory, a register, a temporary memory, etc. Control then proceeds to block 612a.

Turning to block 612a, the analyzer 504a determines if there are additional RAs to be analyzed for possible additions to the RAI list. When there are additional RAs to be analyzed, the analyzer 504a determines the support characteristics of the next RA and control returns to block 606a. When there are no further RAs to be analyzed, the list store 506a stores the list (block 614a). An example process for sending the stored list was described in conjunction with FIG. 4d. An example process and apparatus for receiving a list is described in conjunction with FIGS. 4c and 5b.

Figure 6B:
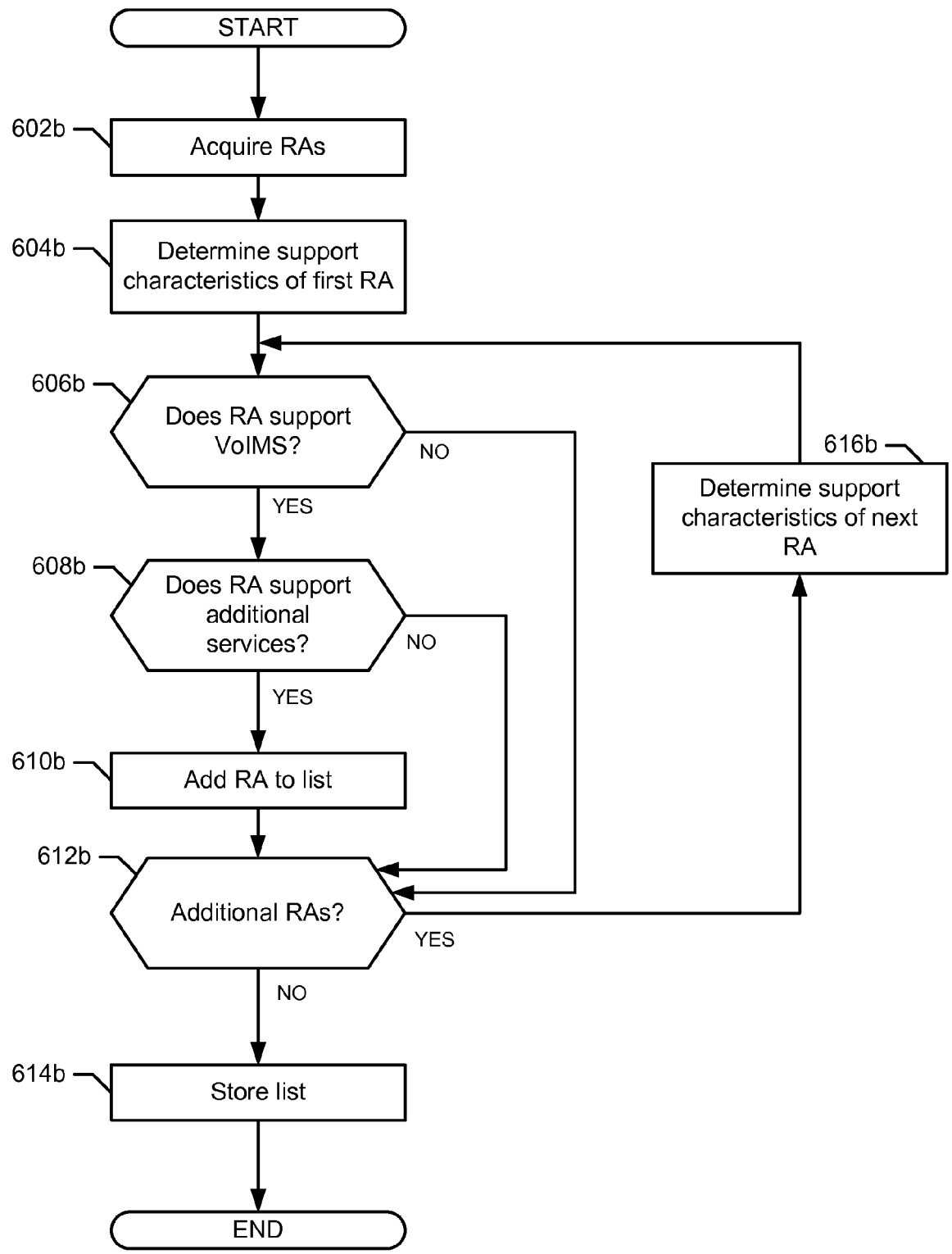
FIG. 6b is a flowchart of an example process to provide a RAI list of TAs that support VoIMS and one or more additional services to a UE in UTRAN and UMTS systems.

FIG. 6b is a flowchart of an example process that may be implemented by the example implementation of the VSM 156 illustrated in FIG. 5a to provide a routing area identifier (RAI) list to a UE (e.g., the mobile station 102) in UTRAN and UMTS systems. The example RAI list may include information about routing areas (RA)s that support the same level of services (e.g., RAs that support VoIMS, RAs that do not support VoIMS, etc.).

The example process of FIG. 6b begins when the receiver 502a acquires information about one or more RAs (block 602b). For example, the receiver 502a may acquire information about RAs from an operator input, from a message transmitted to the receiver 502a via a network, etc. Then, the analyzer 504a selects the first RA received and analyzes the support characteristics of the RA (block 604b). For example, the analyzer 504a may analyze operator input information for an RA to determine what services the RA supports. The example analyzer 504a determines, for example, if the selected RA supports VoIMS (block 606b). When the RA does not support VoIMS, control proceeds to block 612b.

When the RA supports VoIMS (block 606b), the analyzer 504a may determine if the RA supports additional desired services (block 608b). When the RA does not support additional desired services, control proceeds to block 612b.

When the RA supports additional desired services (block 608b), the analyzer 504a adds the RA to a RAI list stored in the list store 506a (block 610b). The list store 506a may be any type of data structure or device capable of storing a RAI list such as, for example, a database, a tangible memory, a register, a temporary memory, etc. Control then proceeds to block 612b.

Turning to block 612b, the analyzer 504a determines if there are additional RAs to be analyzed for possible additions to the RAI list. When there are additional RAs to be analyzed, the analyzer 504a determines the support characteristics of the next RA and control returns to block 606b. When there are no further RAs to be analyzed, the list store 506a stores the list (block 614b). An example process for sending the stored list was described in conjunction with FIG. 4d. An example process and apparatus for receiving a list is described in conjunction with FIGS. 4c and 5b.

Figure 7A:
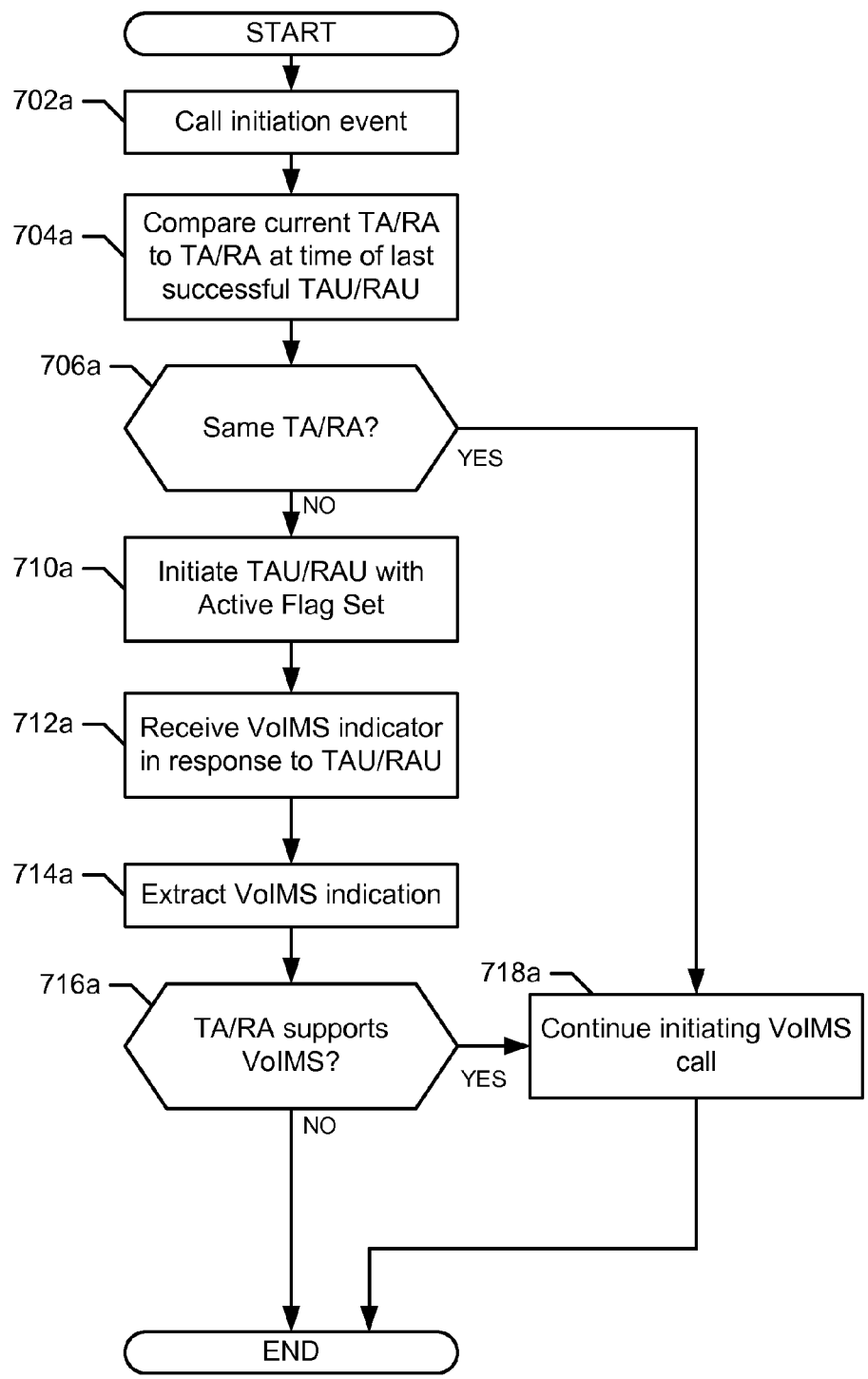
FIG. 7a is a flowchart of an example process to determine VoIMS support of a TA or RA communicatively coupled to a UE.
Figure 8:
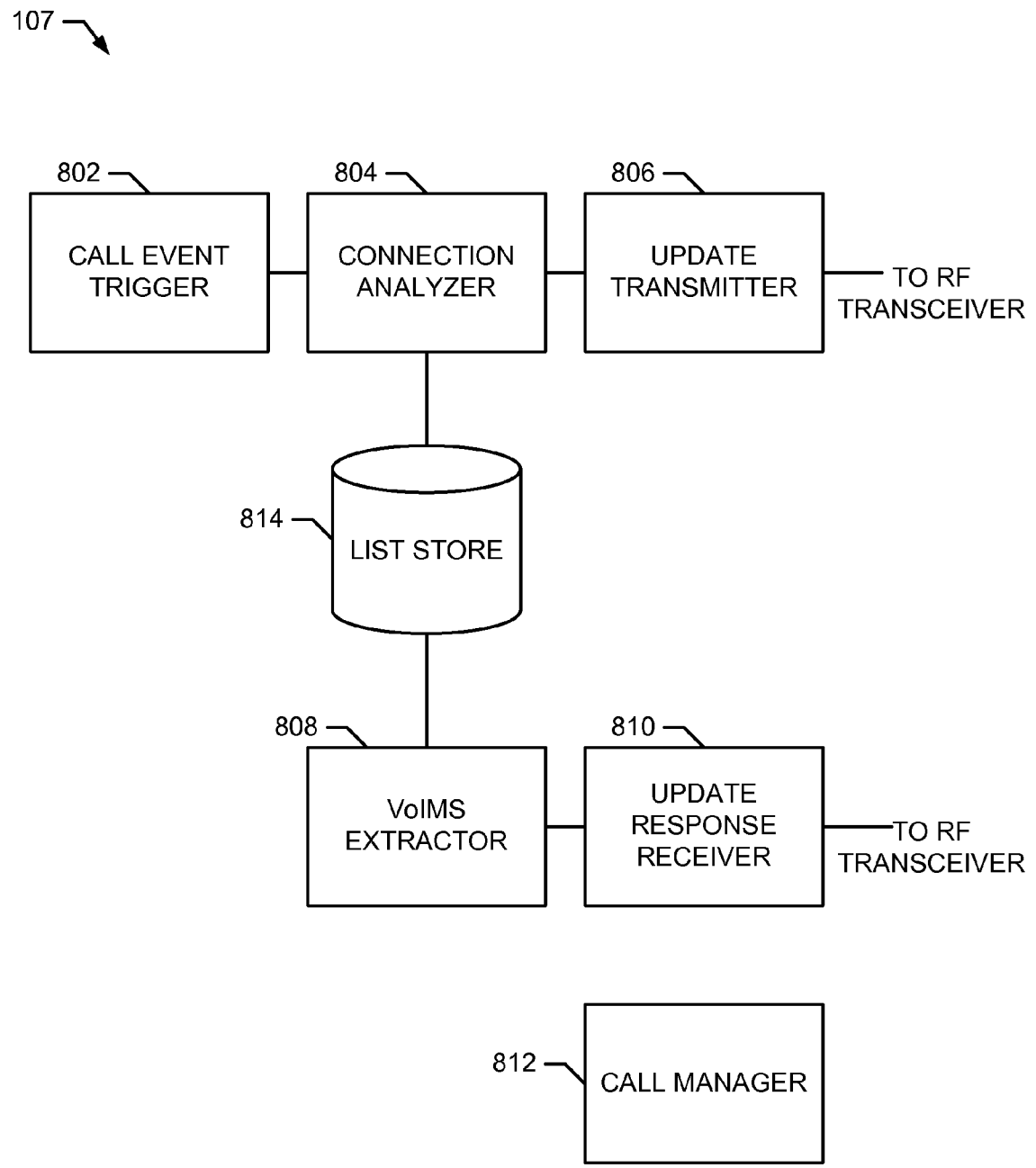
FIG. 8 is a block diagram of an example VNSM that may implement the process of FIGS. 7a and 7b.

FIG. 7a is a flowchart of an example process that may be implemented by the example implementation of the VNSM 107 illustrated in FIG. 8 to determine VoIMS support of a TA or RA communicatively coupled to a UE (e.g., the mobile station 102 of FIG. 1). The example VNSM 107 includes a call event trigger 802, a connection analyzer 804, an update transmitter 806, a VoIMS extractor 808, an update response receiver 810, and a call manager 812 and is connected to a list store 814 that may be stored in or implemented by the VoIMS memory block 145. The process of FIG. 7a may be applied to TAs or RAs, accordingly, the areas will be referenced as TA/RA throughout.

The process of FIG. 7a begins when a call initiation event is detected by the call event trigger 802 (block 702a). For example, the process of FIG. 7a may be implemented in the call initiation process, may be triggered by a call initiation process, etc. The connection analyzer 804 then compares the current TA/RA (the TA/RA in which the UE now resides) to the TA/RA in which the UE resided at the time that the last ATTACH, TAU, or RAU was performed successfully (block 704a). Based on the comparison, the connection analyzer 804 determines if the UE has moved to a new TA/RA since receiving the VoIMS indicator in response to the last ATTACH, TAU, or RAU (block 706a). In other words, the connection analyzer 804 determines if the VoIMS support indication currently recognized by the UE may be invalid because the UE has moved to a TA/RA that may not have the same service support as the previous TA/RA. When the UE has not moved to a new TA/RA, the call manager 812 continues the call initiation (block 718a).

When the UE has moved to a new TA/RA (block 706a), the update transmitter 806 initiates a TAU/RAU (block 710a). For example, the TAU/RAU may be initiated even if the UE has not moved to a TA/RA in a different TAI/RAI list. When initiating the TAU/RAU the update transmitter 806 of the illustrated example sets the Active Flag to TRUE to indicate a request for the user plane radio bearer to remain active subsequent to the TAU/RAU procedure. Accordingly, the user plane radio bearer is established and the NAS signaling connection is not torn down and is kept active so that when the call is initiated after the TAU/RAU, a radio bearer does not need to be created for the call attempt. The TAU/RAU may be transmitted to a connected network via the RF transceiver 108. The connected network generates a response and transmits the response to the UE. The update response receiver 810 receives a response from the network (e.g., a TAU/RAU ACCEPT) (block 712a). The VoIMS extractor 808 extracts a VoIMS indication from the response (block 714a). In addition, the VoIMS indication may be stored in association with an identification of the TA so that it can later be retrieved as described in further detail in conjunction with FIG. 7b.

The call manager 812 then determines if the TA/RA supports VoIMS based on the extracted VoIMS indication (block 716a). When the TA/RA supports VoIMS, the call manager 812 continues the call initiation using VoIMS (block 718a).

When the TA/RA does not support VoIMS (block 716a), the call manager 812 does not attempt to initiate a VoIMS call. The call manager 812 may undertake to initiate the call using other methods as described in conjunction with FIG. 7b. The call manager 812 may attempt o use CS to initiate the call, may attempt change cells or RATs to locate support for VoIMS, etc.

Figure 7B:
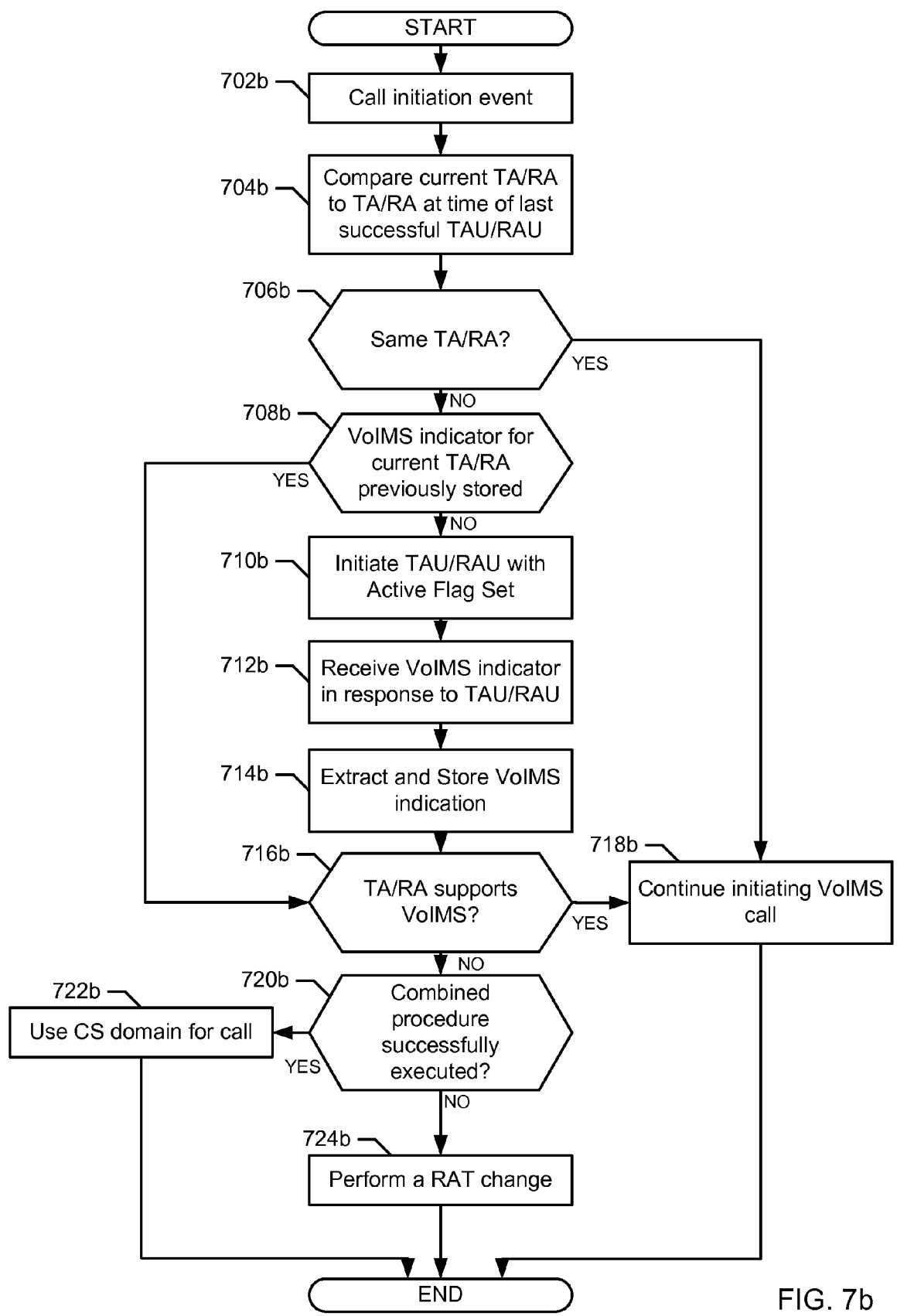
FIG. 7b is a flowchart of an example process to determine VoIMS support of a TA or RA communicatively coupled to a UE.

FIG. 7b is a flowchart of an example process that may be implemented by the example implementation of the VNSM 107 illustrated in FIG. 8 to determine VoIMS support of a TA or RA communicatively coupled to a UE (e.g., the mobile station 102 of FIG. 1). The process of FIG. 7b may be applied to TAs or RAs, accordingly, the areas will be referenced as TA/RA throughout.

The process of FIG. 7b begins when a call initiation event is detected by the call event trigger 802 (block 702b). For example, the process of FIG. 7b may be implemented in the call initiation process, may be triggered by a call initiation process, etc.

The connection analyzer 804 then compares the current TA/RA (the TA/RA in which the UE now resides) to the TA/RA in which the UE resided at the time that the last ATTACH, TAU, or RAU was performed successfully (block 704b). Based on the comparison, the connection analyzer 804 determines if the UE has moved to a new TA/RA since receiving the VoIMS indicator in response to the last ATTACH, TAU, or RAU (block 706b). In other words, the connection analyzer 804 determines if the VoIMS support indication currently recognized by the UE may be invalid because the UE has moved to a TA/RA that may not have the same service support as the previous TA/RA. When the UE has not moved to a new TA/RA, the call manager 812 continues the call initiation (block 718b).

When the current TA/RA (the TA/RA in which the UE now resides) and the TA/RA in which the UE resided at the time that the last ATTACH, TAU, or RAU was performed successfully are different (block 706b), the connection analyzer 804 determines if a VoIMS indicator has previously been stored in the list store 814 for the current TA/RA (block 708b). For example, the list store 814 may store a UE-created TAI list or UE-created RAI list and may be updating the list with VoIMS support indications as TA/RA VoIMS support is determined (e.g., in an ATTACH ACCEPT/TAU ACCEPT/RAU ACCEPT responses). Alternatively, the list store 814 may store a list of TAs/RAs that have been encountered by the UE and may store indications of VoIMS support for the TAs/RAs as such information is determined. When a VoIMS indicator (e.g., indicating that VoIMS is supported or that VoIMS is not supported) has been previously stored for the TA/RA, control proceeds to block 716b.

When a VoIMS indicator has not been previously stored for the current TA/RA (block 708b), the update transmitter 806 initiates a TAU/RAU (block 710b). For example, the TAU/RAU may be initiated even if the UE has not moved to a different TAI/RAI list. When initiating the TAU/RAU the update transmitter 806 of the illustrated example sets the Active Flag to TRUE to indicate a request for the user plane radio bearer to be maintained subsequent to the TAU/RAU procedure. Accordingly, the user plane radio bearer is established and the NAS signaling connection is not torn down and is kept active so that when the call is initiated after the TAU/RAU, a radio bearer does not need to be created for the call attempt. The TAU/RAU may be transmitted to a connected network via the RF transceiver 108. The connected network generates a response and transmits the response to the UE. The update response receiver 810 receives a response from the network (e.g., a TAU/RAU ACCEPT) (block 712b). The VoIMS extractor 808 extracts a VoIMS indication from the response and stores the indication in the list store 814 in association with the current TA/RA (block 714b). In other words, the VoIMS indication is stored so that it can later be retrieved as described in conjunction with block 708b.

The call manager 812 then determines if the TA/RA supports VoIMS based on the extracted or stored VoIMS indication (block 716b). When the TA/RA supports VoIMS, the call manager 812 continues the call initiation using VoIMS (block 718b).

When the TA/RA does not support VoIMS (block 716b), the call manager 812 determines if a combined registration procedure has previously been executed (block 720b). In other words, the call manager 812 determines if the UE is registered for both CS and PS services such that the UE is prepared for both PS and CS voice communications. When the UE has successfully executed a combined registration procedure, the call manager 812 uses CSFB to initiate the call as a CS voice communication using the current RAT (block 722b).

When the UE has not successfully executed a combined registration procedure (block 720b), the call manager 812 signals for a change of RAT to switch to a RAT that can support the call as a CS call. Alternatively, if a combined registration procedure has not been attempted prior to block 720b, a combined registration procedure may be attempted and block 720b will operate based on the result.

Figure 9:
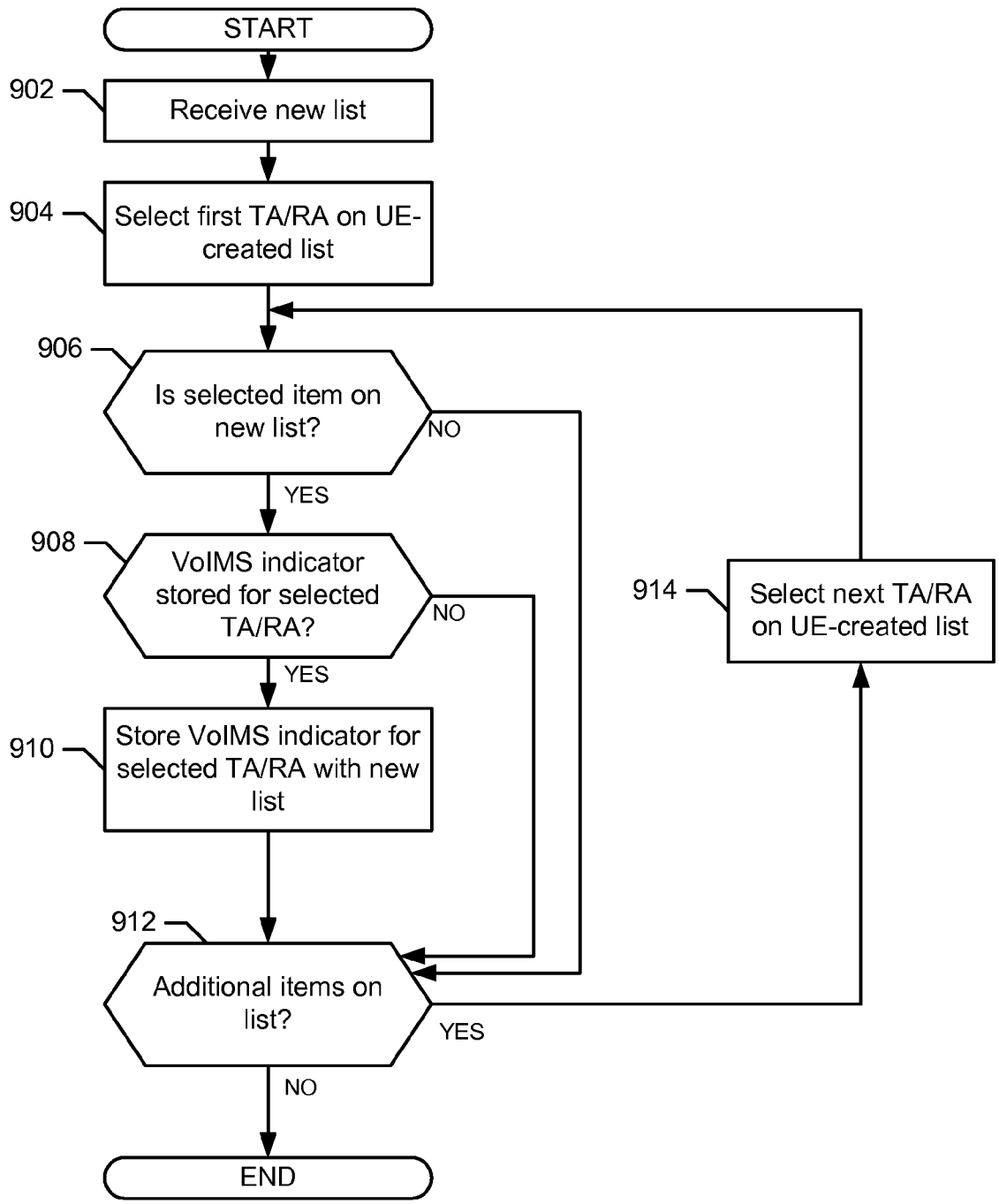
FIG. 9 is a flowchart of an example process to maintain VoIMS support indications.
Figure 10:
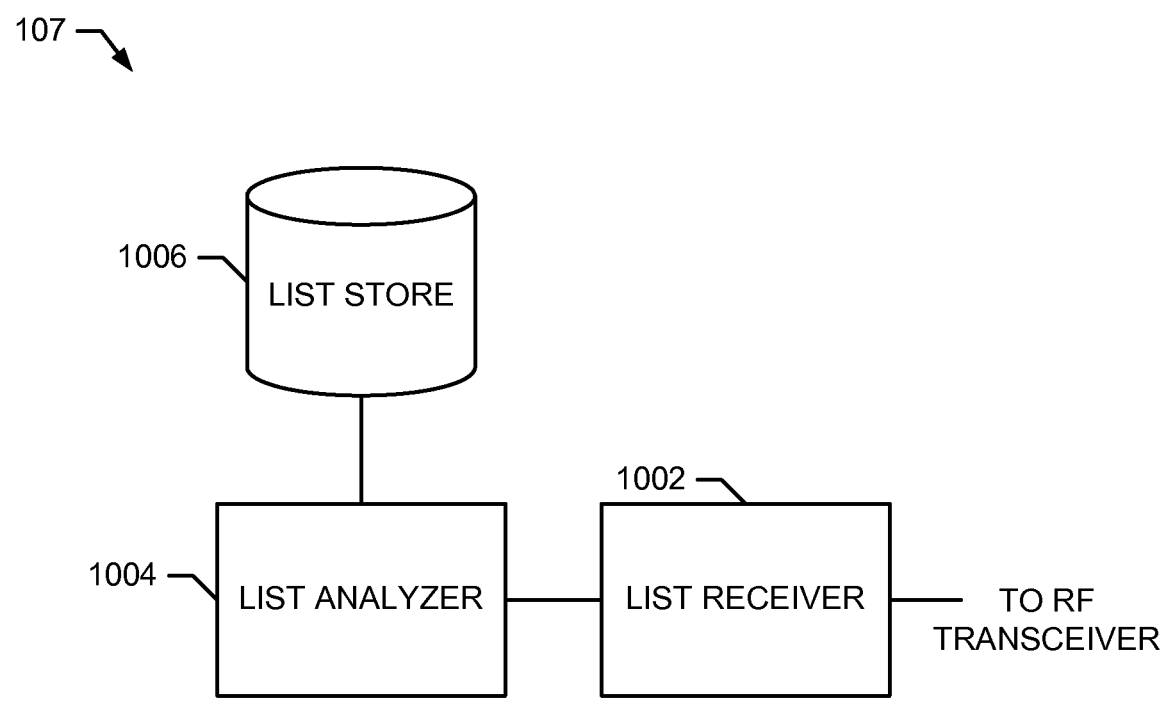
FIG. 10 is a block diagram of an example VNSM that may implement the process of FIG. 9.

FIG. 9 is a flowchart of an example process that may be implemented by the example implementation of the VNSM 107 illustrated in FIG. 10 to maintain VoIMS support indications when a UE switches TAI/RAI lists. The example VNSM 107 includes a list receiver 1002, a list analyzer 1004, and a list store 1006 that may be stored in the VoIMS memory block 145. Like other processes described herein, the process of FIG. 9 may be implemented in conjunction with other described processes. For example, the process of FIG. 9 may be implemented in conjunction with the process of FIG. 7 to enable the VNSM 107 to maintain VoIMS indication information when moving to a TA/RA that is on a different TAI/RAI list than the current TA/RA.

The process of FIG. 9 begins when the list receiver 1002 receives a new TAI/RAI list (block 902). For example, the list may be received via the RF transceiver 108. The new TAI/RAI list may be received because the UE is moving from a TA/RA on a current TAI/RAI list to a TA/RA on a new TAI/RAI list. The list analyzer 1004 selects a first TA/RA that is on a previous list (e.g., a UE-created TAI/RAI list) that is stored in the list store 1006 (block 904). For example, the previous list may be a UE-created list of TAs/RAs that have been encountered by the UE as the UE has moved throughout the network. The stored list may include one or more TAs/RAs that are associated with VoIMS indications that have been received and/or stored by the UE. The example list analyzer 1004 then determines if the selected TA/RA is on the newly received TAI/RAI list (block 906). When the TA/RA is not on the newly received TAI/RAI list, control proceeds to block 912.

When the TA/RA is on the newly received TAI/RAI list (block 906), the list analyzer 1004 determines if a VoIMS indicator is stored in the list store 1006 for the selected TA/RA (block 908). When a VoIMS indicator is not stored in the list store 1006 for the selected TA/RA, control proceeds to block 912.

When a VoIMS indicator is stored in the list store 1006 for the selected TA/RA (block 908), the list analyzer 1004 stores an indication in the list store 1004 for the newly received TAI/RAI list indicating the known support of VoIMS for the selected TA/RA (block 910). In other words, the list analyzer 1004 ensures that known support levels for TAs/RAs that are on both the previously stored/received list and newly received list are maintained when a list change occurs. Control then proceeds to block 912.

Turning to block 912, the list analyzer 1004 determines if there are additional TAs/RAs on the previous TAI/RAI list to be analyzed (block 912). When there are additional TAs/RAs on the previous TAI/RAI list, the list analyzer 1004 selects the next TA/RA (block 914) and control returns to block 906. When there are no additional TAs/RAs on the previous TAI/RAI list, the process of FIG. 9 completes.

Figure 11:
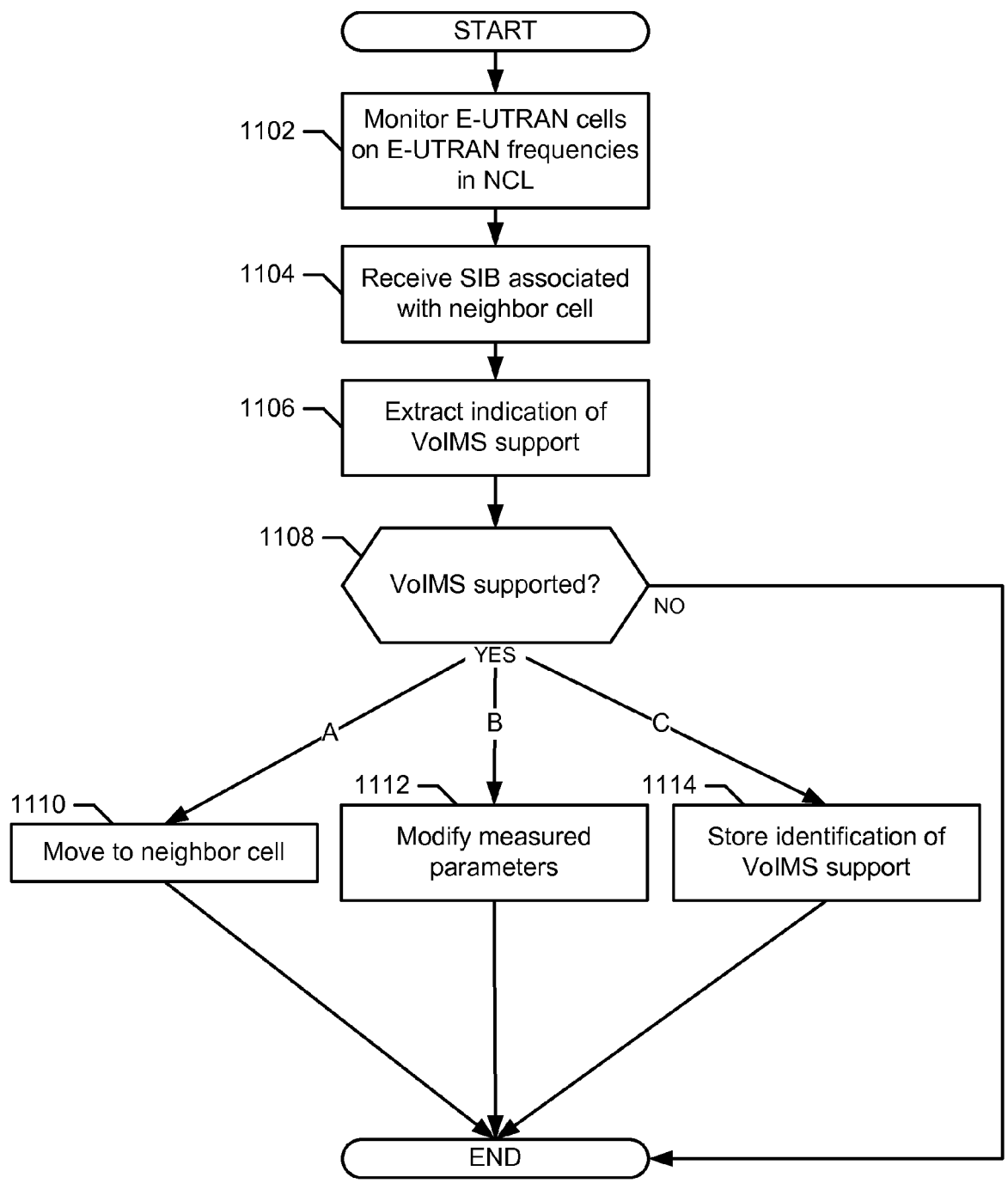
FIG. 11 is a flowchart of an example process to reselect to a neighbor cell when it is determined that a neighbor cell supports VoIMS while the current cell does not support VoIMS.
Figure 12:
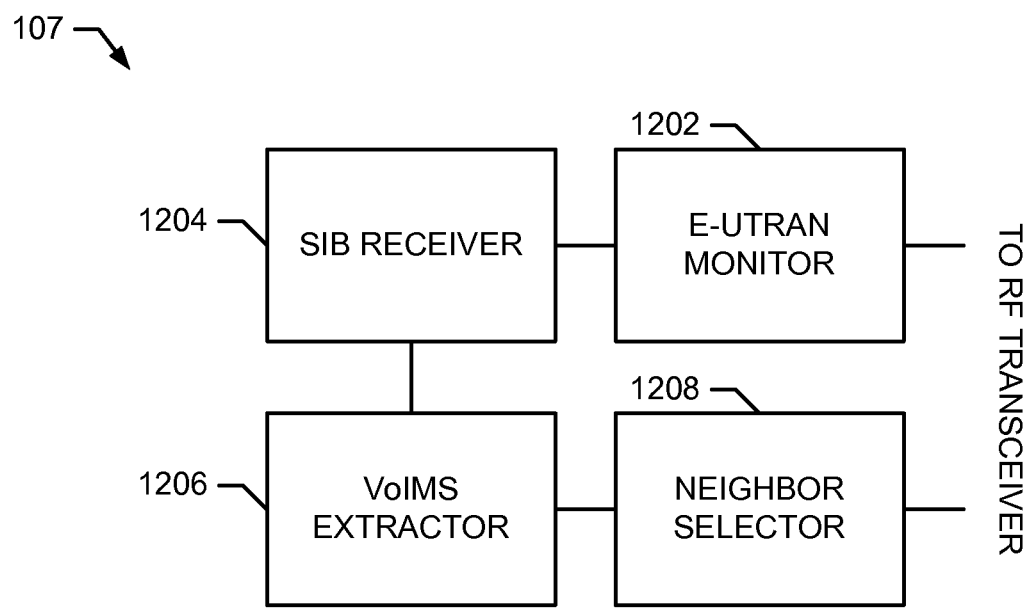
FIG. 12 is a block diagram of an example VNSM that may implement the process of FIG. 11.

FIG. 11 is a flowchart of an example process that may be implemented by the example implementation of the VNSM 107 illustrated in FIG. 12 to reselect to a neighbor cell when it is determined that a neighbor cell supports VoIMS while the current cell does not support VoIMS. For example, the process of FIG. 11 may be performed whenever it is determined that VoIMS support is desired by the UE but is not available at a currently connected or camped upon cell. The example VNSM 107 includes an evolved UTRAN (E-UTRAN) monitor 1202, a system information block (SIB) receiver 1204, a VoIMS extractor 1206, and a neighbor selector 1208.

The example process of FIG. 11 begins when a UE is in a GERAN or UTRAN and the E-UTRAN monitor 1202 monitors cells on E-UTRAN frequencies in a neighbor cell list (NCL) at the UE (block 1102). The SIB receiver 1204 receives a SIB that is broadcast by a cell (block 1104). According to the illustrated example, the cell that sent the SIB has been configured to provide a VoIMS indication in conjunction with (e.g., combined with, embedded in, associated with, etc.) the SIB. The SIB may also include TA information for the cell. While FIGS. 11 and 12 are described with respect to a VoIMS indication in the SIB, any other service indication may be included and processed. For example, the SIB may indicate support or lack of support of VoLGA. The VoIMS extractor 1206 extracts the VoIMS indication from the SIB (block 1106). The neighbor selector 1208 then determines if the VoIMS indication indicates that the neighbor cell that sent the SIB supports VoIMS (block 1108). When the neighbor cell does not support VoIMS, there is no need to move to the neighbor cell and no action is taken in response to the determination. In some examples, instead of taking action, the neighbor selector 1208 may update the information in a stored TAI list, and/or VoIMS indicator list. When the neighbor cell supports VoIMS, the neighbor selector 1208 the UE performs one or more of blocks 1110, 1112, and 1114 to operate based on the information. While branches A, B, and C are described separately, one or more of the branches A, B, and C may be performed together in sequence or in parallel.

In branch A of the flowchart, after determining that VoIMS is supported (block 1108), the neighbor selector 1208 causes the UE to move to the neighbor cell (e.g., reselect or handover) so that VoIMS communications may be initiated or maintained (block 1110).

In branch B of the flowchart, after determining that VoIMS is supported (block 1108), the neighbor selector 1208 may identify the E-UTRAN cell that supports VoIMS as a reselection or handover target and modify measured parameters for the E-UTRAN cell to provide a bias to this cell for reselection or handover (block 1112).

In branch C of the flowchart, after determining that VoIMS is supported (block 1108), the VoIMS extractor 1206 may store an indication of VoIMS support in, for example, the VoIMS memory block 145 (block 1114). For example, when the UE stores a list of TAs/RAs that have been encountered by the UE, the VoIMS extractor 1206 may store an indication with the TA/RA for which support has been determined indicating that the TA/RA supports VoIMS. Likewise, when the UE stores a received TAI/RAI list, the VoIMS extractor 1206 may store an indication with the TA/RA for which support has been determined indicating that the TA/RA supports VoIMS.

Figure 13:
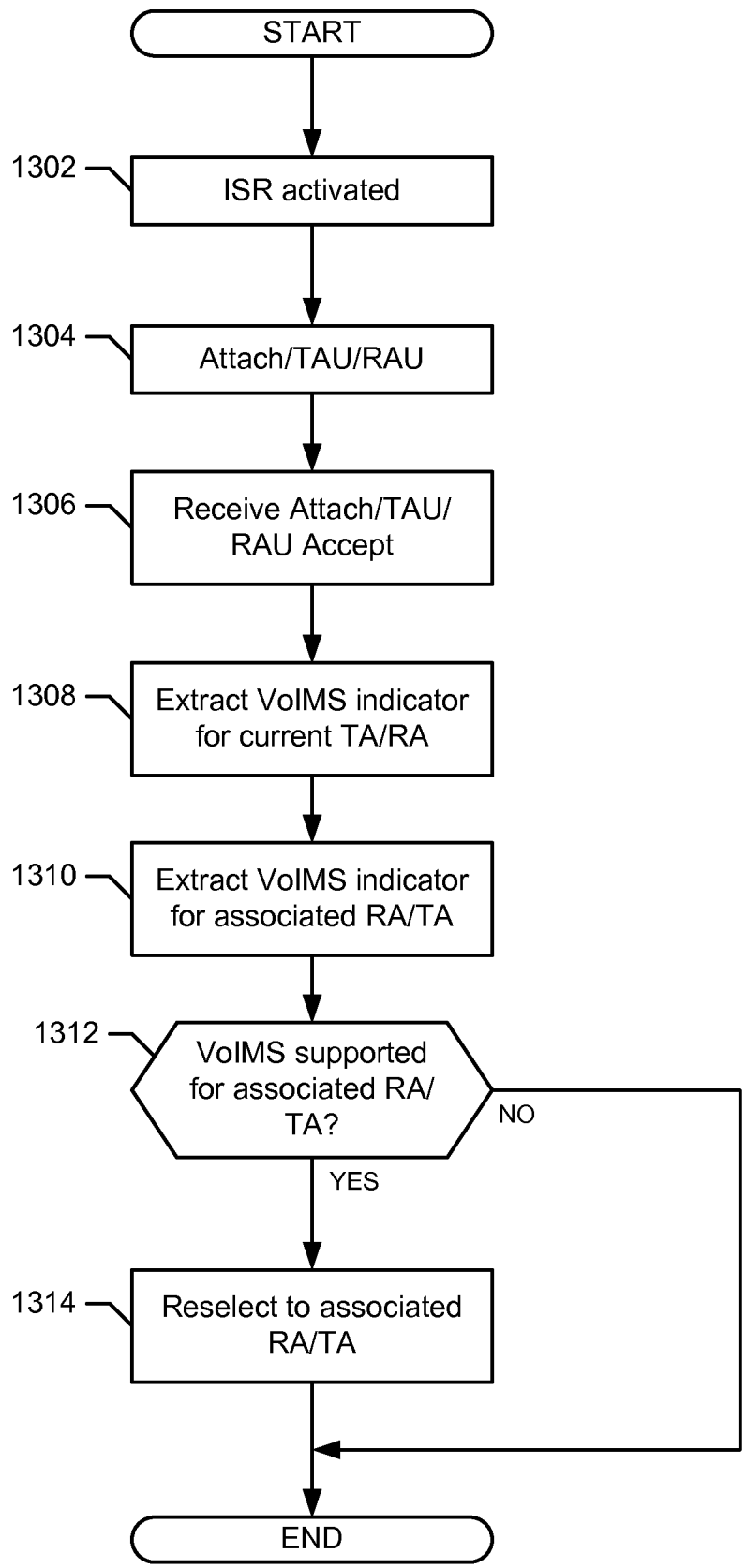
FIG. 13 is a flowchart of an example process to reselect to an associated radio access technology (RAT).
Figure 14:
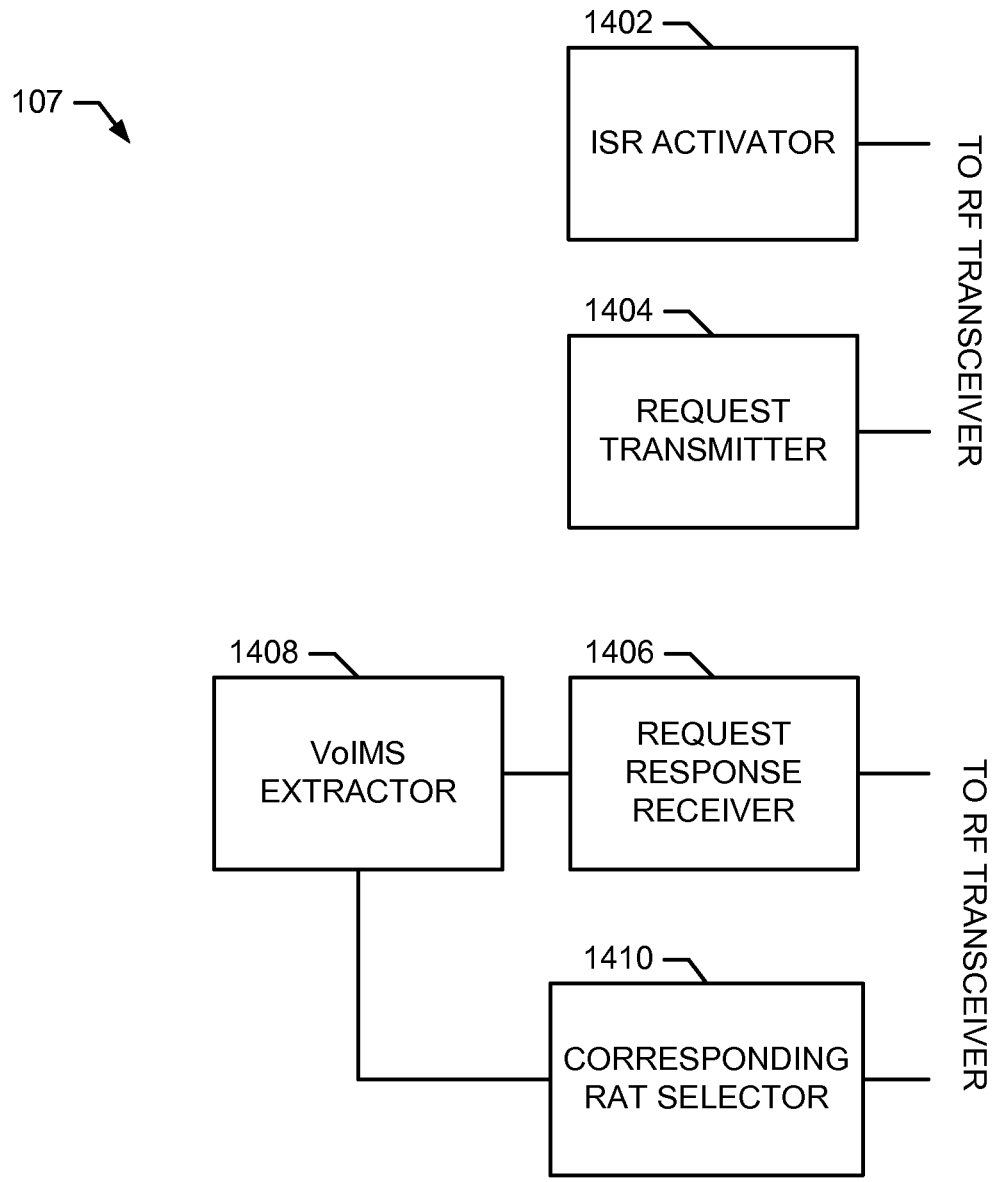
FIG. 14 is a block diagram of an example VNSM that may implement the process of FIG. 13.

FIG. 13 is a flowchart of an example process that may be implemented by the example implementation of the VNSM 107 illustrated in FIG. 14 to reselect to an associated RAT in an idle mode signaling reduction (ISR) environment when it is determined that a corresponding RAT supports VoIMS while the current RAT does not support VoIMS. For example, the process of FIG. 13 may be performed whenever it is determined that VoIMS support is desired but is not available at a currently connected RAT. The example VNSM 107 includes an ISR activator 1402, a request transmitter 1404, a request response receiver 1406, a VoIMS extractor 1408, and a corresponding RAT selector 1410.

The process of FIG. 13 begins when the ISR activator 1402 ensures that ISR is activated for the UE (block 1302). ISR allows the UE to be simultaneously registered in a RA and a TA so that the UE can switch between UTRAN/GERAN and E-UTRAN without the need for signaling. The request transmitter 1404 sends an ATTACH, TAU, or RAU request to the network (block 1304). For example, the request transmitter 1404 may send an ATTACH request when the UE first attempts to connect to a network or may sends a TAU or RAU when the UE is moving throughout the network.

The request response receiver 1406 then receives a response to the request (block 1306). According to the illustrated example, the mobility manager that transmitted the response has been configured to provide a VoIMS indication for the current TA/RA in the response. In addition, the mobility manager has been configured to provide a VoIMS indication for the associated RA/TA. In other words, when the UE is communicating via a registration with a TA, the mobility manager will include a VoIMS indicator for the registered TA and the RA to which the UE can be connected without having to perform a RAU registration update, which is enabled by the enabled ISR function. Likewise, when the UE is communication via a registration with an RA, the mobility manager will include a VoIMS indicator for the registered RA and the TA to which the UE can be connected without having to perform a TAU registration update, which is enabled by the enabled ISR function.

The VoIMS extractor 1408 extracts the VoIMS indications included in the received response (block 1308 and 1310). The corresponding RAT selector 1410 then analyzes the VoIMS indicators to determine if the current TA/RA does not support VoIMS but the associated RA/TA supports VoIMS (block 1312). When the current TA/RA supports VoIMS or both the current TA/RA and the associated RA/TA do not support VoIMS, no action to switch to the associated RA/TA is taken. When the current TA/RA does not support VoIMS and the associated RA/TA supports VoIMS, the corresponding RAT selector 1410 causes the UE to switch to the associated RA/TA to enable VoIMS communications.

Figure 15:
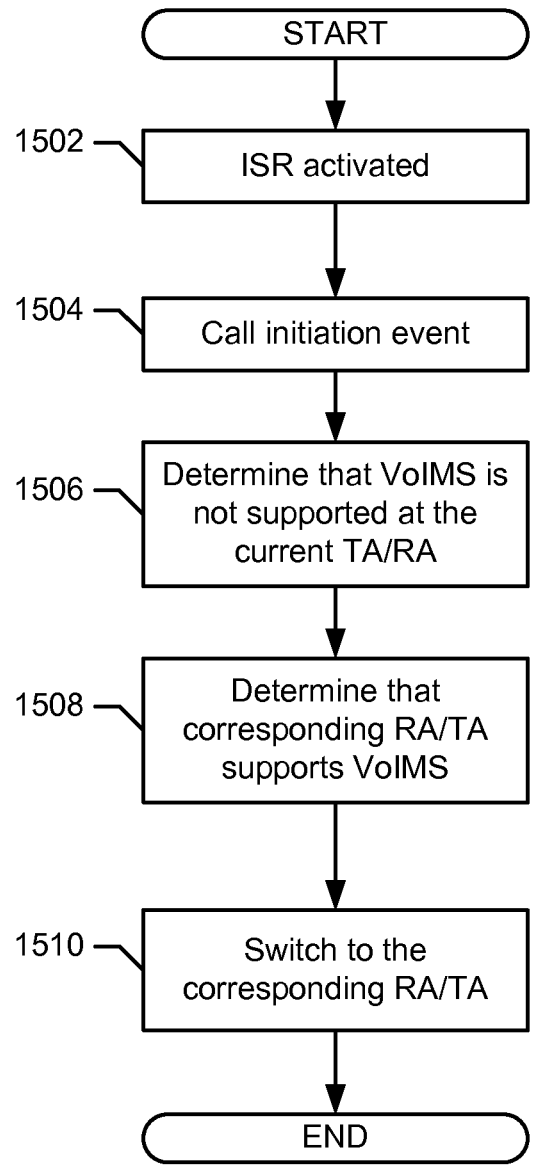
FIG. 15 is a flowchart of an example process to reselect to an associated RAT in an ISR environment when it is determined that a corresponding RAT supports VoIMS while the current RAT does not support VoIMS.
Figure 16:
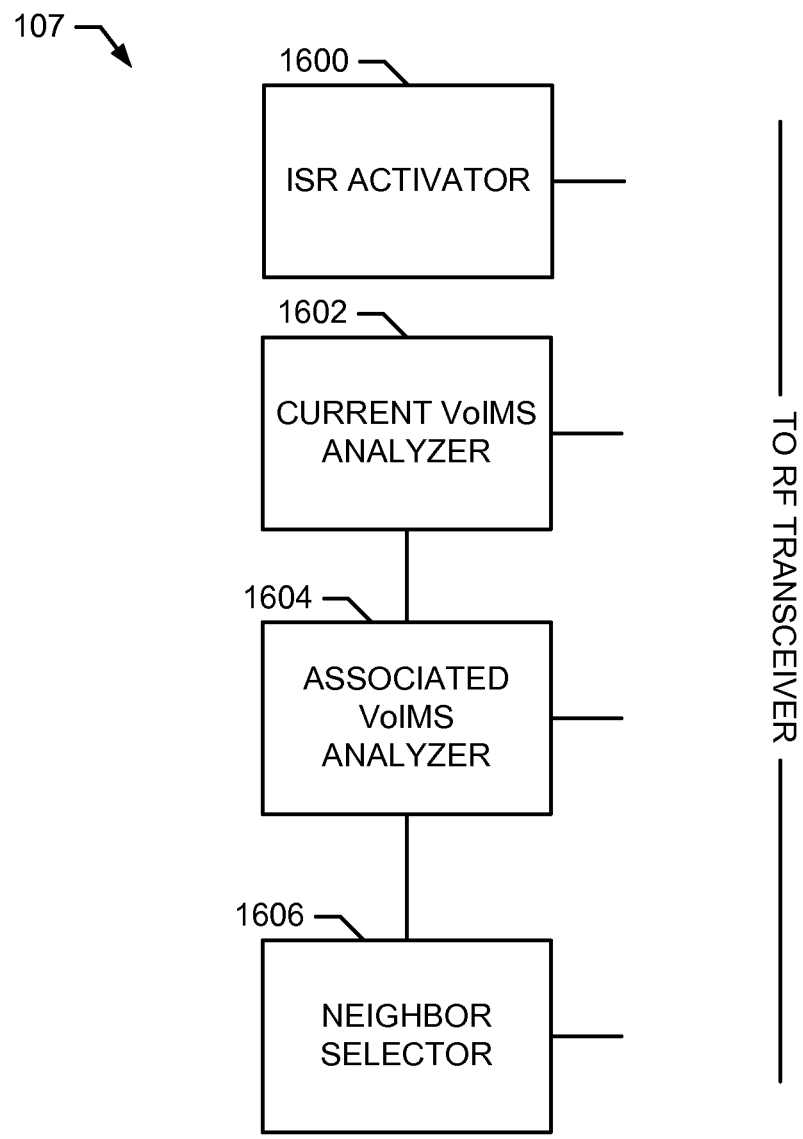
FIG. 16 is a block diagram of an example VNSM that may implement the process of FIG. 15.

FIG. 15 is a flowchart of an example process that may be implemented by the example implementation of the VNSM 107 illustrated in FIG. 16 to reselect to an associated RAT in an ISR environment when it is determined that a corresponding RAT supports VoIMS while the current RAT does not support VoIMS. For example, the process of FIG. 15 may be performed whenever it is determined that VoIMS support is desired but is not available at a currently connected RAT. The example VNSM 107 includes an ISR activator 1600, a current VoIMS analyzer 1602, an associated VoIMS analyzer 1604, and a corresponding RAT selector 1606.

The process of FIG. 15 begins when the ISR activator 1600 ensures that ISR is activated for the UE (block 1502). ISR allows the UE to be simultaneously registered in a RA and a TA so that the UE can switch between UTRAN/GERAN and E-UTRAN without the need for signaling. The current VoIMS analyzer 1602 to determines that a VoIMS call initiation has been requested (block 1504). The current VoIMS analyzer 1602 then determines that VoIMS is not supported by the current RAT to which the UE is connected (block 1506). The associated VoIMS analyzer 1604 then determines if a corresponding RAT supports VoIMS (block 1508). For example, when the UE is connected to a TA but is registered via ISR to a RA, the associated VoIMS analyzer 1604 will determine if the RA supports VoIMS when the current VoIMS analyzer 1602 has determined that the TA does not support VoIMS. The associated VoIMS analyzer 1602 may use any process or indication to determine that VoIMS is supported at the corresponding RA. For example, the associated VoIMS analyzer 1602 may operate in conjunction with the processes of FIGS. 6*a* and 6*b* to determine that the corresponding RA is on a list of RAs that all support VoIMS and, thus, the corresponding RA supports VoIMS.

In another example implementation, the associated VoIMS analyzer 1602 may operate in conjunction with the process of FIG. 11 to analyze a broadcast SIB that indicates that the corresponding RA supports VoIMS. Alternatively, any other process for determining that VoIMS is supported may be used.

When the associated VoIMS analyzer 1602 determines that the corresponding RA supports VoIMS (block 1508), the neighbor selector 1606 causes the UE to initiate communication with the corresponding RA so that a VoIMS communication session can be initiated (block 1510).

Additionally or alternatively to block 1510, the current VoIMS analyzer 1602 and the associated VoIMS analyzer 1604 may store VoIMS support information for later retrieval. For example, when the UE stores a TAI/RAI list or other list or identification of TAs/RAs, the current VoIMS analyzer 1602 and the associated VoIMS analyzer 1604 may store an indication of VoIMS support in association with a TA/RA for which VoIMS support has been determined. By storing the indication, the VoIMS support of a TA/RA can be retrieved at a later time when the TA/RA is encountered by the UE.

Figure 17:
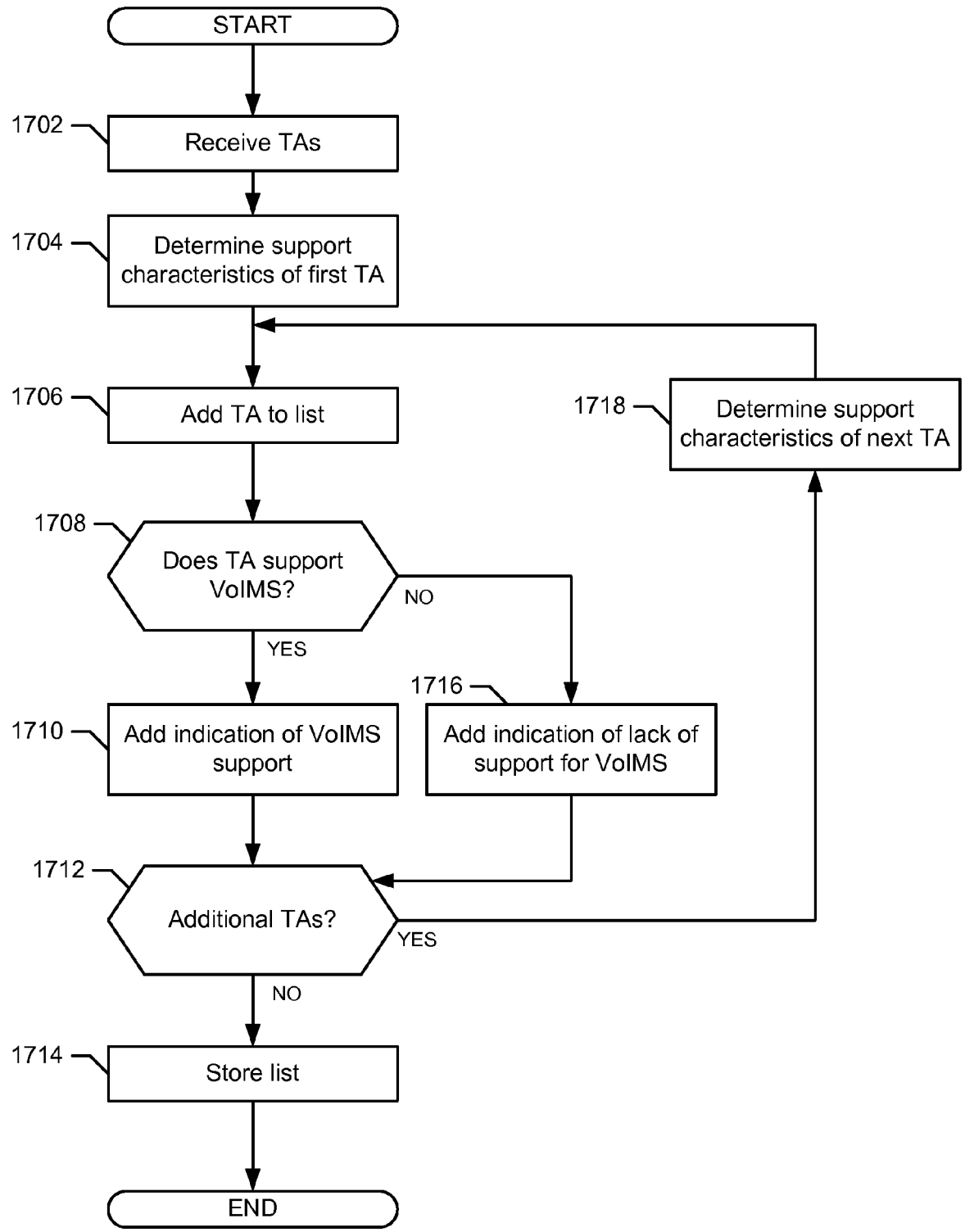
FIG. 17 is a flowchart of an example process to provide a TAI list to a UE.
Figure 18:
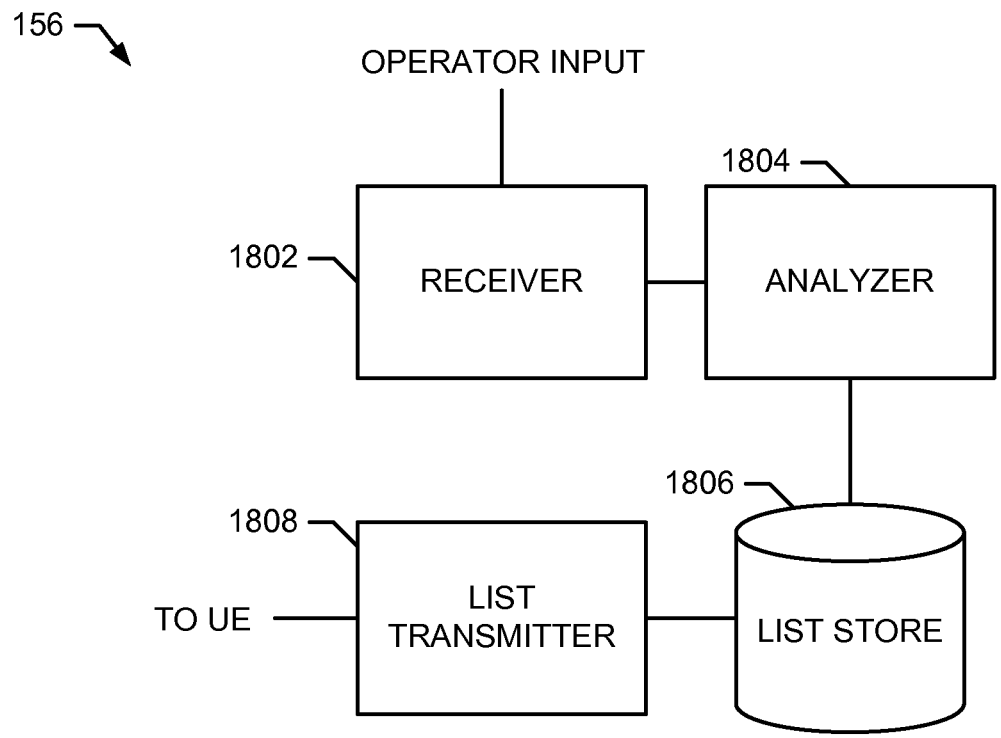
FIG. 18 is a block diagram of an example VSM that may implement the process of FIG. 17.

FIG. 17 is a flowchart of an example process that may be implemented by the example implementation of the VSM 156 illustrated in FIG. 18 to provide a TAI list to a UE (e.g., mobile station 102). The example TAI list may includes an indication of whether TAs on the TAI list supports VoIMS communications. The example VSM 156 of FIG. 18 includes a receiver 1802, an analyzer 1804, a list store 1806, and a list transmitter 1808.

The example process of FIG. 17 begins when the receiver 1802 receives information about one or more TAs (block 1702). For example, the receiver 1802 may receive information about TAs from an operator input, from a message transmitted to the receiver 1802 via a network, etc. Then, the analyzer 1804 selects the first TA received and analyzes the support characteristics (e.g., a set of support levels for one or more services) of the TA (block 1704). For example, the analyzer 1804 may analyze the operator input to determine what services the TA supports. The analyzer 1804 adds an identification of the TA to a TAI list stored in the list store 1806 (block 1706). The example analyzer 1804 then determines if the selected TA supports VoIMS (or one or more other services in other example implementations) (block 1708). When the TA does not support VoIMS, the analyzer 1804 adds an indication that the TA does not support VoIMS to the TAI list (block 1716) and control proceeds to block 1712. When multiple services are analyzed, blocks 1708, 1710 and 1716 may be repeated for each service such that a list for multiple services may be generated.

When the TA supports VoIMS (block 1708), the analyzer 1804 stores an indication in the TAI list that the TA supports VoIMS. For example, an example TAI list format is shown in Table 1. Alternatively any other format may be used and the table may include any other additional information. For example, while the illustrated example includes an indication of VoIMS support for each TA, the list may additionally or alternatively include an indication of support for another service such as VoLGA. The list may include a columns for each service, may include a separate entry for each TA for each service, may include a list of services supported for each TA, etc.

TABLE 1

Example TAI list with VoIMS support indication

| TAIs | Support for VoIMS Yes/No |
|---|---|
| TA_A | Y |
| TA_B | N |
| TA_C | Y |
| TA_D | N |
| TA_E | Y |

After storing an indication of the VoIMS capabilities for the TA in the TAI list (blocks 1708 and 1716), the analyzer 1806 determines if there are additional TAs to be analyzed (block 1712). When there are additional TAs to be analyzed, the example analyzer 1806 determines the support characteristics of the next TA (block 1718) and control proceeds to block 1706. When there are no further TAs to be analyzed, the list store 1806 may store the list (block 1714). An example process for transmitting the list to a UE is described in conjunction with FIG. 4d. In an example implementation, the process of FIG. 18 may be initiated in response to an ATTACH request or a TAU request, the list transmitter 1808 may combine the TAI list with an ATTACH ACCEPT or TAU ACCEPT response for sending to the UE. While the TAI list is described as being transmitted after block 1712, the TAI list may remain stored for a period of time and other processes may occur before the TAI list is transmitted to a UE. For example, the TAI list may be sent to a UE the next time that the UE initiates a TAU. While the example implementation is described in conjunction with TAs on a TAI list, RAs on an RAI list may alternatively be used.

Figure 19:
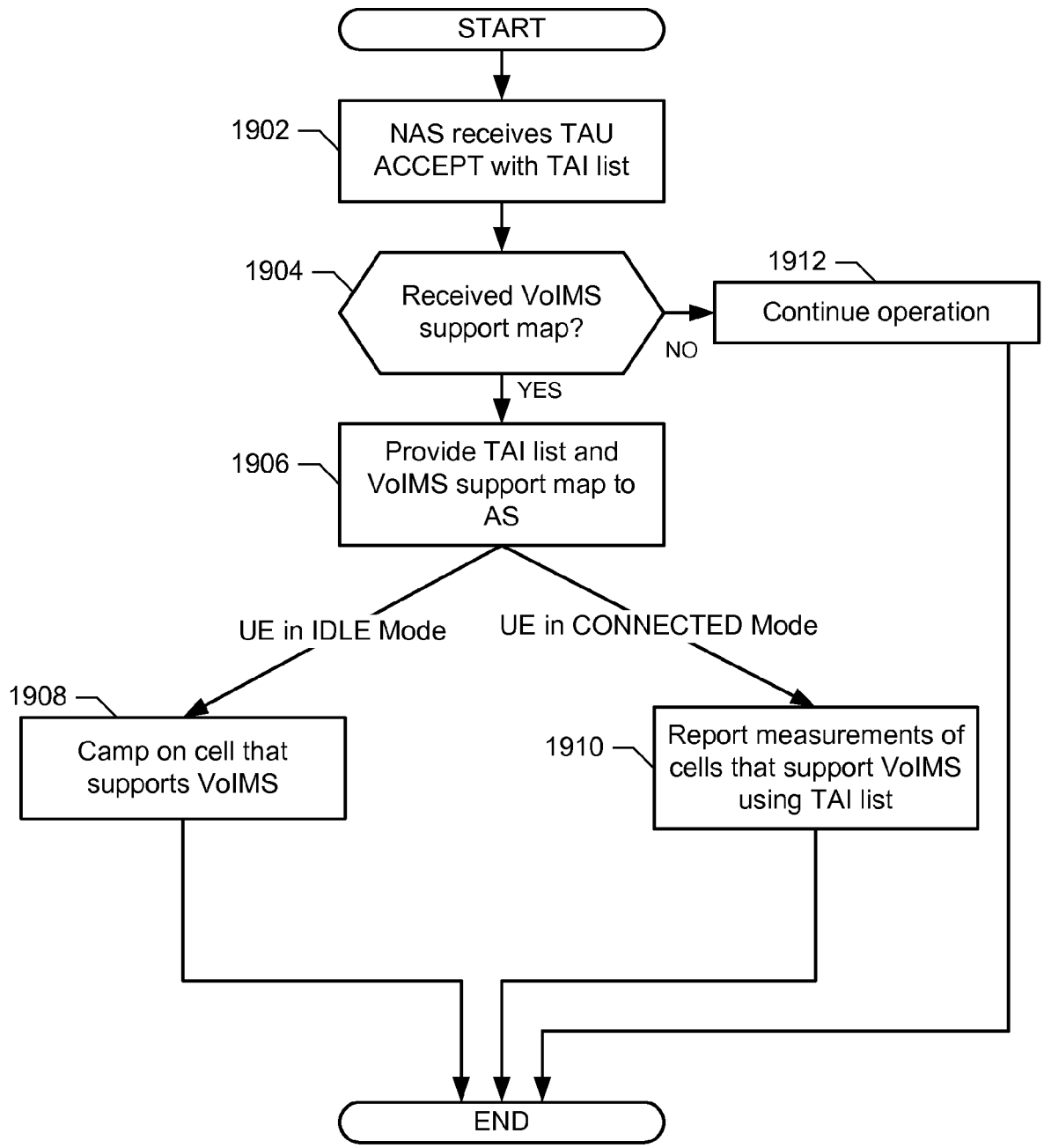
FIG. 19 is a flowchart of an example process to make a VoIMS support map or table available from a non-access stratum (NAS) protocol layer to an access stratum (AS) protocol layer of a UE.
Figure 20:
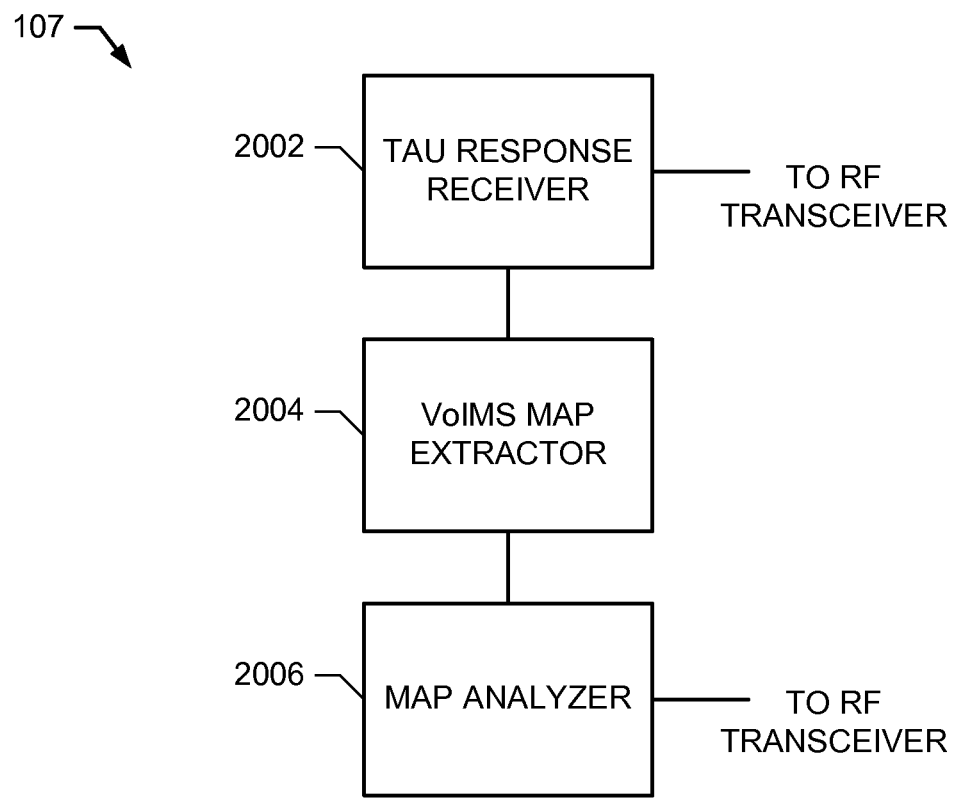
FIG. 20 is a block diagram of an example VNSM that may implement the process of FIG. 19.

FIG. 19 is a flowchart of an example process that may be implemented by the example implementation of the VNSM 107 illustrated in FIG. 20 to make a VoIMS support map or table available from a non-access stratum (NAS) protocol layer to an access stratum (AS) protocol layer of a UE. The example VNSM 107 includes a TAU response receiver 2002, a VoIMS map extractor 2004, and a map analyzer 2006.

The process of FIG. 19 begins when the TAU response receiver 2002 operating at the NAS protocol level receives a TAU response (block 1902). For example, a TAU request may have been previously sent and processed by a mobility manager of a network. The VoIMS map extractor 2004 then determines if the received TAU response includes a VoIMS support map (e.g., a VoIMS support map formatted like Table 1) (block 1904). When a VoIMS support map is not included in the TAU response, the UE continues to process the TAU response (block 1912).

When a service support map is included in the TAU response (block 1904), the VoIMS map extractor 2004 (or any other type of service extractor or general extractor) extracts the service support map and the map analyzer 2006 makes the service support map available to the AS protocol layer of the UE (block 1906). Accordingly, the UE can utilize the service support map during operation.

For example, when the UE is in IDLE mode, the UE can find suitable cells and compare the cells to the received service support map to locate a suitable cell that supports a particular service and subsequently camp on the suitable cell that supports the service (block 1908). When multiple services are available, the UE will camp on the service having the highest priority as defined by, for example, a network operator, a user of the UE, etc. Alternatively, when the UE is in CONNECTED mode, the UE can report measurements of cells that support the particular service as indicated on the service support map using a received TAI list (block 1910). By reporting the measurements only for the cells that support the particular service, the UE can increase the possibility that any handovers occur to cells that support that service. When multiple services are available, the UE will camp on the service having the highest priority as defined by, for example, a network operator, a user of the UE, etc.

Figure 21:
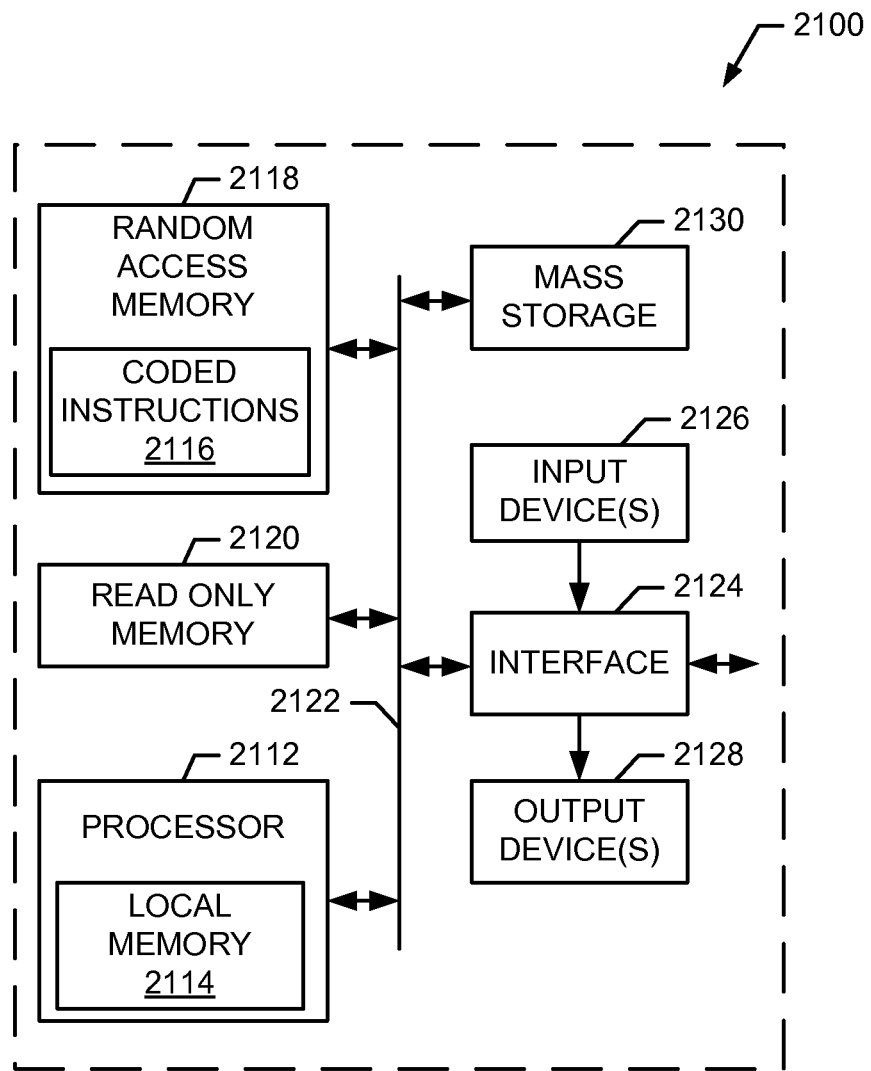
FIG. 21 is a block diagram of an example processing system capable of implementing the apparatus and methods disclosed herein.

FIG. 21 is a block diagram of an example processing system 2100 capable of implementing the apparatus and methods disclosed herein. The processing system 2100 can correspond to, for example, a mobile station processing platform, a network element processing platform, a server, a personal computer, a personal digital assistant (PDA), an Internet appliance, a mobile phone, or any other type of computing device. For example the processing system 2100 may implement the mobile station 102 and any component of the mobile communication networks 104.

The system 2100 of the instant example includes a processor 2112 such as a general purpose programmable processor, an embedded processor, a microcontroller, etc. The processor 2112 includes a local memory 2114, and executes coded instructions 2116 present in the local memory 2114 and/or in another memory device. The processor 2112 may execute, among other things, machine readable instructions to implement the processes represented in FIGS. 4a, 4b, 4c, 6a, 6b, 7, 9, 11, 13, 15, 17, and 19. The processor 2112 may be any type of processing unit, such as one or more microprocessors from the Intel® Centrino® family of microprocessors, the Intel® Pentium® family of microprocessors, the Intel® Itanium® family of microprocessors, and/or the Intel® XScale® family of processors, one or more microcontrollers from the ARM® family of microcontrollers, the PIC® family of microcontrollers, etc. Of course, other processors from other families are also appropriate.

The processor 2112 is in communication with a main memory including a volatile memory 2118 and a non-volatile memory 2120 via a bus 2122. The volatile memory 2118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2120 may be implemented by flash memory and/or any other desired type of memory device. Access to the main memory 2118, 2120 is typically controlled by a memory controller (not shown).

The computer 2100 also includes an interface circuit 2124. The interface circuit 2124 may be implemented by any type of interface standard, such as an Ethernet interface, a universal serial bus (USB), and/or a third generation input/output (3GIO) interface.

One or more input devices 2126 are connected to the interface circuit 2124. The input device(s) 2126 permit a user to enter data and commands into the processor 2112. The input device(s) can be implemented by, for example, a keyboard, a mouse, a touchscreen, a track-pad, a trackball, an isopoint and/or a voice recognition system.

One or more output devices 2128 are also connected to the interface circuit 2124. The output devices 2128 can be implemented, for example, by display devices (e.g., a liquid crystal display, a cathode ray tube display (CRT)), by a printer and/or by speakers. The interface circuit 2124, thus, typically includes a graphics driver card.

The interface circuit 2124 also includes a communication device such as a modem or network interface card to facilitate exchange of data with external computers via a network (e.g., an Ethernet connection, a digital subscriber line (DSL), a telephone line, coaxial cable, a cellular telephone system such as an EGPRS-compliant system, etc.).

In some examples, the computer 2100 also includes one or more mass storage devices 2130 for storing software and data. Examples of such mass storage devices 2130 include floppy disk drives, hard drive disks, compact disk drives and digital versatile disk (DVD) drives.

As an alternative to implementing the methods and/or apparatus described herein in a system such as the device of FIG. 21, the methods and or apparatus described herein may be embedded in a structure such as a processor and/or an ASIC (application specific integrated circuit).

Finally, although certain example methods, apparatus and articles of manufacture have been described herein, the scope of coverage of this disclosure is not limited thereto. On the contrary, this disclosure covers all methods, apparatus and articles of manufacture fairly falling within the scope of the appended claims either literally or under the doctrine of equivalents.

What is claimed is:

1. A method of a mobility manager, the method comprising:
   receiving a mobile network request for registering with a mobile network; and
   responsive to the mobile network request, sending a response including an area identity list and an identifier indicating whether an area identified in the area identity list supports a service, wherein the identifier indicates that a first area in the area identity list supports the service and the identifier indicates that a second area in the area identity list does not support the service.

2. A method as defined in claim 1, wherein the service is voice over internet protocol multimedia subsystem service (VoIMS).

3. A method as defined in claim 1, wherein the service is voice over long term evolution (LTE) via generic access (VoLGA).

4. A method as defined in claim 1, wherein the network request is a TRACKING AREA UPDATE and the response is a TRACKING AREA UPDATE ACCEPT.

5. A method as defined in claim 1, wherein the network request is a ROUTING AREA UPDATE and the response is a ROUTING AREA UPDATE ACCEPT.

6. A method as defined in claim 1, wherein the network request is an ATTACH request and the response is an ATTACH ACCEPT.

7. A method as defined in claim 1, wherein the identifier indicates whether all areas on the area identity list support the service.

8. A method as defined in claim 1, further comprising:
   acquiring information about a set of areas; and
   selectively storing areas that support the service in the area identity list.

9. A method as defined in claim 1, further comprising:
   acquiring information about a set of areas;
   selectively storing areas that support the service and a second service in the area identity list.

10. A method as defined in claim 1, wherein the area identity list is at least one of a tracking area identity list and a routing area identity list.

11. A mobility manager comprising:
    a receiver to receive a mobile network request for registering with a mobile network; and
    a transmitter responsive to the mobile network request, to send a response including an area identity list and an identifier indicating whether an area identified in the area identity list supports a service, wherein the identifier indicates that a first area in the area identity list supports the service and the identifier indicates that a second area in the area identity list does not support the service.

12. A mobility manager as defined in claim 11, wherein the service is voice over internet protocol multimedia subsystem service (VoIMS).

13. A mobility manager as defined in claim 11, wherein the service is voice over long term evolution (LTE) via generic access (VoLGA).

14. A mobility manager as defined in claim 11, wherein the network request is a TRACKING AREA UPDATE and the response is a TRACKING AREA UPDATE ACCEPT.

15. A mobility manager as defined in claim 11, wherein the network request is an ATTACH request and the response is an ATTACH ACCEPT.

16. A mobility manager as defined in claim 11, wherein the network request is a ROUTING AREA UPDATE and the response is a ROUTING AREA UPDATE ACCEPT.

17. A mobility manager as defined in claim 11, wherein the identifier indicates whether all areas on the area identity list support the service.

18. A mobility manager as defined in claim 11, further comprising:
    an acquirer to acquire information about a set of areas; and
    an analyzer to selectively store areas that support the service in the area identity list.

19. A mobility manager as defined in claim 11, further comprising:
    an acquirer to acquire information about a set of areas;
    an analyzer to selectively store areas that support the service and a second service in the area identity list.

20. A mobility manager as defined in claim 11, wherein the area identity list is at least one of a tracking area identity list and a routing area identity list.

21. A mobile station comprising:
    a transmitter to send a network request; and
    a receiver to receive a response to the network request including an area identity list and an identifier indicating whether an area identified in the area identity list supports a service, wherein the identifier indicates that a first area in the area identity list supports the service and the identifier indicates that a second area in the area identity list does not support the service.

22. A mobile station as defined in claim 21, further comprising a list extractor to extract the area identity list from the response.

23. A mobile station as defined in claim 22, further comprising a manager to determine whether all areas identified on the area identity list support the service based on the identifier.

24. A mobile station as defined in claim 21, wherein the area identity list is at least one of a tracking area identity list and a routing area identity list.

* * * * *